United States Patent
Suzuki et al.

[11] Patent Number: 5,785,761
[45] Date of Patent: Jul. 28, 1998

[54] FINE PARTICLES DISPERSING APPARATUS

[75] Inventors: Akihiro Suzuki; Akihiro Obara; Keiji Kamata, all of Miyagi-ken, Japan

[73] Assignee: Alps Electric Co., Ltd., Tokyo, Japan

[21] Appl. No.: 502,301

[22] Filed: Jul. 13, 1995

[30] Foreign Application Priority Data

Jul. 22, 1994 [JP] Japan .................. 6-171458

[51] Int. Cl.⁶ .................................................. B05C 5/00
[52] U.S. Cl. ................... 118/612; 239/659; 239/DIG. 5; 222/198; 222/199
[58] Field of Search ................ 239/659, DIG. 5; 222/198, 199, 196; 118/612

[56] References Cited

U.S. PATENT DOCUMENTS

| | | |
|---|---|---|
| 2,613,994 | 10/1952 | Peters ................... 239/DIG. 5 X |
| 4,071,170 | 1/1978 | Gunzel, Jr. et al. ........... 222/199 X |
| 4,251,013 | 2/1981 | Krause ....................... 222/198 |
| 4,291,835 | 9/1981 | Kaufman .............. 239/DIG. 5 X |
| 4,371,101 | 2/1983 | Cane et al. ................. 222/199 X |
| 4,836,417 | 6/1989 | Uchiyama et al. ........... 222/198 X |

FOREIGN PATENT DOCUMENTS 6-301041  10/1994  Japan .

Primary Examiner—Jeffrey Snay
Attorney, Agent, or Firm—Guy W. Shoup; Patrick T. Bever

[57] ABSTRACT

A fine particle dispersing apparatus including a cylindrical body, a funnel nozzle provided at the bottom of the cylindrical body, and a valve having a clearance forming member forming a clearance with the inner wall of the funnel nozzle which is larger than the diameter of the fine particles. The funnel nozzle and/or the clearance forming member oscillates, thereby causing the fine particles present within the funnel nozzle to pass through the clearance and discharge from the nose portion of the funnel nozzle.

16 Claims, 12 Drawing Sheets

FINE PARTICLES DISPERSING APPARATUS

BACKGROUND OF THE INVENTION

1. Field of the Invention

The present invention relates to an apparatus for dispersing fine particles on a substrate and more particularly to an apparatus for dispersing gap spacers on a substrate of a liquid crystal display.

2. Description of the Related Art

A liquid crystal display is generally constituted by sandwiching a liquid crystal layer 140 in between two glass substrates 141 and 142, as shown schematically in FIG. 14. A suitable thickness (cell gap), indicated at g, is set (usually 5 μm or so) according to the kind of liquid crystal used, etc. But if the liquid crystal layer thickness in a liquid crystal display produced actually deviates from such set value, there may occur unevenness in contrast or in color at the time of display.

In order to make the cell gap, g, constant with a high accuracy, there are used gap spacers which are resinous fine particles having a diameter almost equal to the cell gap which is set. More particularly, as shown in FIG. 15, the thickness of the cell gap, g, is kept constant by interposing gap spacers 24, 24, . . . between both substrates 141 and 142 which hold a liquid crystal layer therebetween.

Thus, dispersing the gap spacers 24 uniformly on the substrates is very important in controlling the cell gap or improving the quality of the liquid crystal display.

Heretofore, as an apparatus for interposing gap spacers 24 between the substrates 141 and 142 there has been known such a fine particles dispersing apparatus 143 as shown in FIG. 16.

In using the fine particles dispersing apparatus 143, first one substrate 142 is set in a predetermined lower position within a box 144 of the apparatus 143 and the box is closed. Then, the gap spacers 24, which are monodispersed in a solvent 145 such as liquid flon (chlorofluorohydrocarbon), are jetted from a nozzle 146 provided in an upper position of the box 144. The gap spacers 24 thus jetted from the nozzle 146 come down while being suspended within the box 144, then reach the substrate 142 and are deposited thereon.

In this case, the gap spacers 24 jetted from the nozzle 146 are dispersed onto the substrate 142 because they are diffused while dropping within the box 144.

For dispersing the gap spacers 24 successively onto a plurality of substrates by means of this apparatus, the substrate 142 with the gap spacers 24 deposited thereon in the above manner is taken out from the box 144, then the gap spacers 24 remaining in the box 144 are removed from an exhaust port 147, thereafter a new substrate is set into the box 144 and the above operations are repeated.

As shown in FIG. 16, by mixing in the nozzle 146 the gap spacers 24 with $N_2$ gas whose flow velocity is high, the dropping velocity of the gap spacers can be increased.

Onto the substrate 142 with the gap spacers 24 thus dispersed on its surface is then put the other substrate 141 so that the gap spacers are sandwiched in between both substrates, followed by seal printing seal liquid crystal in the space between both substrates, whereby there is assembled such a liquid crystal display as shown in FIG. 14, which has a preset value of cell gap, g.

In the fine particles dispersing apparatus 143 described above, however, it is difficult to control the state of dispersion because the gap spacers 24 are dispersed by suspension and diffusion thereof within the box 144. For example, it is impossible to control the dispersion as to permit the gap spacers 24 to be deposited on only a limited surface area of the substrate 142 as necessary.

Besides, the efficiency of use of the gap spacers 24 is very low because the gap spacers remaining in the box 144 are exhausted out and discarded at every replacement of the substrate 142 for the purpose of depositing a constant amount of gap spacers on the substrate. At present, only 6% or so, only about 18% at most, of the gap spacers 24 jetted into the box 144 are deposited on the substrate 142 and utilized effectively.

As the solvent 145 which is used in jetting the gap spacers 24 from the nozzle 146 there has been used liquid flon as a preferable solvent. Recently, however, the use of flon is not desired because of an environmental problem caused by flon and instead the use of water has been being tried. But the use of water causes agglomeration of the gap spacers 24 markedly and it becomes difficult to disperse and deposit the gap spacers 24 onto the substrate 142.

Further, unlike liquid flon or the like, water requires a long time for evaporation, and as a countermeasure, the provision of a heater or the like in the fine particles dispersing apparatus 143 or a blower in the box 144 may be effective. In this case, however, not only the cost increases but also the degree of efficiency improvement is low.

In the foregoing apparatus, the use of the box 144 which surrounds dropping fine particles is essential to prevent the action of an unsuitable air current during the drop of fine particles, and in order to disperse the gap spacers 24 it is necessary to ensure a certain distance H' from the nozzle 146 up to the substrate 142. Consequently, it has so far been impossible to attain the reduction in size of the fine particles dispersing apparatus 143. In the illustrated apparatus 143, the height H' is 1 m or so.

Moreover, not only the gap spacers are allowed to fall naturally by gravity but also the operation is carried out by a batch process involving replacement of the substrate 142, jetting of the gap spacers 24 and exhaust at every operation. Thus, on an industrial scale, the production rate is slow (about 20 minutes is required for only the dropping of the gap spacers 24) and the cost is high.

According to means wherein fine particles are discharged through a fine hole formed in a cylindrical container for the particles, clogging is apt to occur due to agglomeration of the fine particles or deposition of the particles on the surface of a valve or the like provided in the discharge hole.

Such inconvenience may be eliminated by feeding pressurized air into the cylindrical container, thereby causing the particles to be discharged forcibly. In this case, however, a tunnel for air only is formed due to agglomeration of the fine particles, thus making satisfactory discharge of the fine particles impossible.

SUMMARY OF THE INVENTION

The present invention has been accomplished for solving the above-mentioned problems and it is the object of the invention to provide an apparatus for dispersing fine particles on a substrate which apparatus is capable of controlling the state of the dispersion, fluidizing the fine particles, enhancing the efficiency of use of the fine particles, remedying unsatisfactory dispersion of the particles due to agglomeration thereof or the like and attaining shortening of the working time and reduction of cost.

The fine particles dispersing apparatus of the present invention includes a cylindrical body, a funnel nozzle provided at the bottom of the cylindrical body, and valve means having a clearance forming member disposed so as to ensure a larger clearance than the particle diameter between it and the inner wall of the funnel nozzle, and is characterized in that with oscillation of the funnel nozzle or the clearance forming member, the fine particles present in the funnel nozzle pass through the clearance and are discharged from the nose portion of the funnel nozzle. In this case, it is desirable that the clearance forming member be oscillated by a change in internal pressure of the cylindrical body.

It is also desirable that the apparatus be provided with a pressure regulator means for adjusting the internal pressure of the cylindrical body.

Further, it is desirable that a pressure change be induced in the cylindrical body be induced within the cylindrical body by feeding pulse air into the cylindrical body.

Preferably, the interior of the cylindrical body is divided into plural chambers by means of a diaphragm or diaphragms capable of pressure transfer in such a manner that a chamber to which the pressure regulator means is connected and a chamber in which the fine particles are received are different from each other.

The valve means may be a spherical body.

Preferably, the valve means is provided with an oscillating means. It is also preferable that the funnel nozzle be provided with an oscillating means.

Further, it is preferable that a piezo-electric element with a high-frequency current applied thereto be used as the oscillating means.

It is preferable that a fine tube nozzle be provided at the nose portion of the funnel nozzle.

Preferably, a particle quantity monitor for measuring the quantity of discharged fine particles is provided at the nose portion of the funnel nozzle.

It is desired that the inside diameter of the fine particles discharge nozzle be not larger than 500 µm and that the fine particles be not larger than 10 µm in diameter.

Preferably, the length of the fine tube nozzle is not smaller than 5 mm.

The present invention is most suitable to the case where the fine particles are gap spacers interposed between the substrates of a liquid crystal display.

Further, it is preferable that stepped portions for forming a clearance be formed on the surface of the clearance forming member or of the funnel nozzle.

According to the fine particles dispersing apparatus of the present invention constructed as above, fluidity is given to the fine particles present near the clearance between the clearance forming member of the valve means and the funnel nozzle by virtue of a relative oscillation induced by oscillation of the valve means and/or the funnel nozzle, whereby it is made easier for the fine particles to enter the clearance between the clearance forming member and the funnel nozzle. Besides, by changing the pressure of pulse air, the fine particles present in the clearance are moved while being dispersed in the nozzle portion below the valve. Consequently, the fine particles present within the funnel nozzle are discharged little by little from the nose portion of the funnel nozzle, whereby the fine particles which are in a satisfactory state of dispersion without agglomeration thereof can be spread onto the surface of a substrate or the like.

Moreover, since it is not that the fine particles are dispersed in such a solvent as liquid flon or water, this is desirable when viewed from the environmental standpoint.

Besides, since it is not necessary to use any equipment for solvent evaporation, it is possible to attain the reduction of size and cost.

Further, according to the apparatus of the present invention, since it is possible to disperse the fine particles without relying on gravity-drop diffusion, the distance between the nozzle and the substrate for deposition of the fine particles thereon can be greatly narrowed. Consequently, (1) the area of fine particles deposition can be made small and it becomes possible to deposit fine particles on only a desired upper surface portion of the substrate; (2) a large proportion of the fine particles discharged from the nozzle can be deposited on the substrate and therefore the efficiency of use of the fine particles is improved; (3) the size of the apparatus can be reduced to a great extent; (4) the working time required for dispersion and deposition of the fine particles can be greatly shortened; (5) since it is not necessary to provide a residual fine particles exhausting and removing step at every replacement of the substrate for deposition of fine particles thereon. It is possible to improve the efficiency of use of fine particles and shorten the working time to a greater extent.

Since the fine particles are discharged together with a high-speed flow through the very narrow clearance, the particles are dispersed to a greater extent during the discharge.

Since the fine particles are oscillated also when they are accommodated within the fine particles dispersing apparatus, their agglomeration is suppressed also from the time when are received into the apparatus.

In the case where the apparatus is of the type which utilizes a change in internal pressure of the cylindrical body, it is possible to effect discharge and dispersion of fine particles easily and highly efficiently.

Further, the internal pressure of the cylindrical body becomes negative when the discharge of fine particles is to be stopped by the valve means, so the fine particles which have just passed through the valve means and which are unnecessary can be drawn back toward the cylindrical body, and thus it is possible to diminish the discharge of excess fine particles.

In this connection, by using a pressure regulator means it is possible to facilitate the control of a pressure change and hence possible to adjust the discharge of fine particles more accurately.

Further, by causing a pressure change under the supply of pulse air it is possible to effect the discharge of fine particles in a more satisfactory manner.

In connection with discharging the fine particles while inducing a pressure change in the interior of the cylindrical body, if the interior of the cylindrical body is partitioned into plural chambers through a diaphragm or diaphragms capable of pressure transfer in such a manner that at least the chamber to which the pressure regulator means is connected and the chamber which contains fine particles are different from each other; it is possible to avoid inconveniences such as back flow of fine particles toward the pressure regulator means.

Moreover, if a spherical valve is used as the valve means, a very simple construction can be attained, which greatly contributes to the reduction of cost of the apparatus.

If the valve means is provided with an oscillating means, the amount of the fine particles discharged can be made highly accurate.

Likewise, if the funnel nozzle is provided with an oscillating means, it is also possible to make the amount of fine particles discharged highly accurate.

In this case, by using as the oscillating means a piezoelectric element with a high-frequency current applied thereto, the amount of fine particles discharged can be adjusted in a satisfactory manner without causing a great increase in size and complication of the apparatus and without great increase of the cost.

By providing a fine tube nozzle at the nose portion of the funnel nozzle, it becomes possible to discharge the fine particles at a higher speed and effect monodispersion and further improvement in the dispersed state of fine particles.

Particularly, these functions can be enhanced by setting the length of the fine tube nozzle at 5 mm or more.

If a monitor for measuring the quantity of fine particles discharged is provided at the nose portion of the funnel nozzle and the data obtained relating to the quantity of fine particles discharged is fed back, it is possible to adjust the quantity of fine particles discharged to an appropriate value at all times.

The apparatus of the present invention is suitable particularly when the diameter of the fine particles is smaller than 10 µm, and in this case it is suitable that the inside diameter of the fine particles discharging nozzle be not larger than 500 µm.

It can be said that the apparatus of the present invention is particularly suitable when the fine particles are gap spacers interposed between the substrates of a liquid crystal display.

Further, by forming stepped portions for constituting clearance on the surface of the clearance forming member or of the funnel nozzle, it is possible to ensure a minimum clearance for the passage of fine particles therethrough. Additionally, since the clearance forming member can be positioned centrally of the funnel nozzle, it is possible to discharge an appropriate quantity of fine particles in a more constant manner.

DETAILED DESCRIPTION OF THE PREFERRED EMBODIMENTS

Embodiments of the present invention will be described hereinunder with reference to the accompanying drawings, but it goes without saying that the invention is not limited thereto.

[Embodiment 1]

Figure 1:
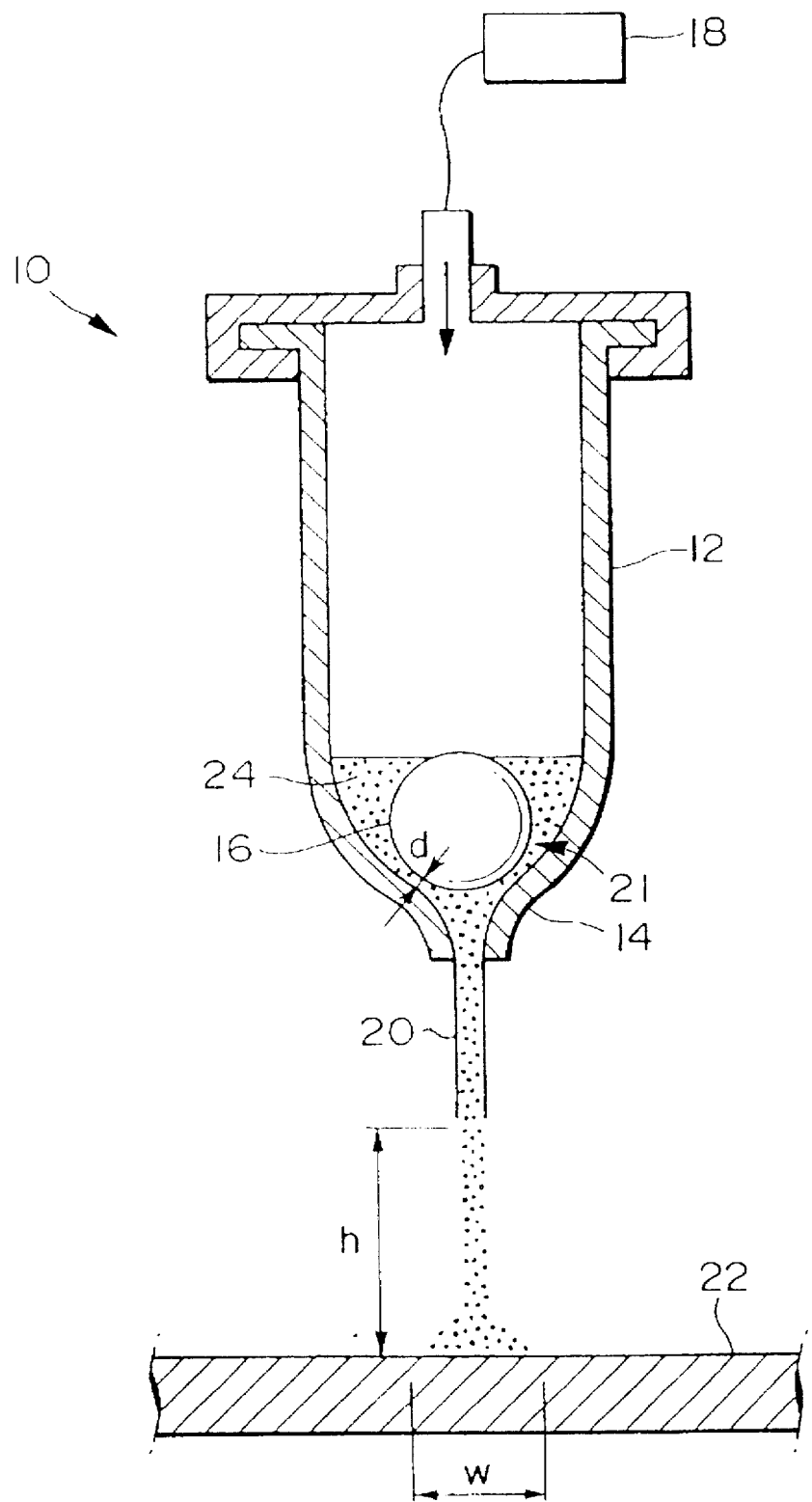
FIG. 1 is a sectional side view of a fine particles dispersing apparatus according to a first embodiment of the present invention.

FIG. 1 illustrates a fine particles dispersing apparatus according to a first embodiment of the present invention.

The fine particles dispersing apparatus shown in FIG. 1 and indicated at 10 substantially comprises a cylindrical body 12, a funnel nozzle 14 formed integrally at the bottom of the cylindrical body 12, and a valve means 16 as a spherical valve disposed inside the funnel nozzle 14.

The funnel nozzle 14 is a tapered mortar-like nozzle. Although in this embodiment the nozzle 14 is formed integrally with the cylindrical body 12, a separate member from the cylindrical body 12 and fulfilling the same function as the funnel nozzle may be bonded to the bottom of the cylindrical body.

Suitable size and material of the valve means 16 as a spherical body are determined according to properties of the fine particles used. As a suitable example of the material there is mentioned SUS.

The upper portion of the cylindrical body 12 is hermetically sealed and a pressure regulator means 18 is connected thereto. The pressure regulator means 18 functions to feed and discharge air intermittently with respect to the interior of the cylindrical body 12, thereby varying the internal pressure of the cylindrical body. It is suitable that pulse air be fed at a cycle of 5 to 30 Hz. As the pressure regulator means, a commonly-used compressor or the like is employable.

Inside the funnel nozzle 14 and around the valve means 16 are accommodated a large amount of fine particles 24.

Further, at the nose portion of the funnel nozzle 14 there is provided a fine tube nozzle 20 which faces a substrate 22 to disperse the fine particles 24 onto the substrate surface. The fine particles discharge velocity can be increased by the fine tube nozzle, the length of which is preferably not less than 5 mm.

In the case where the apparatus of this embodiment is used as an apparatus for dispersing gap spacers interposed between the substrate of a liquid crystal display, the gap spacers are usually not larger than 10 µm, but in this case it is preferred that the inside diameter of the fine tube nozzle be not larger than 500 µm.

In using the fine particles dispersing apparatus 10 of this embodiment, first the internal pressure of the cylindrical body 12 is reduced by the pressure regulator means 18, whereupon the valve means 16 rises slightly by virtue of the resulting negative pressure in the cylindrical body 12 and a clearance 21 which is annular in cross section with the valve means 16 as the center is formed between the inner wall of the funnel nozzle 14 and the valve means 16. The degree of such rising motion of the valve means 16 is proportional to the amount of the negative pressure in the cylindrical body 12 and is adjusted suitably by controlling the pressure regulator means 18.

The clearance 21 between the inner wall of the funnel nozzle 14 and the valve means 16 is formed so as to be slightly larger than the size (diameter) of each fine particle. This is because if the clearance distance is smaller than the fine particle size, the fine particles cannot pass through the clearance 21, and if it is twice or more the size of each fine particle, the fine particles will be discharged in an agglomerated state and thus there is a fear of deterioration in the state of dispersion. For example, in the case where the fine particles 24 are gap spacers of a liquid crystal display and are each 5 μm in diameter, it is desirable that the distance, d, between the valve means 16 and the funnel nozzle 14 in the presence of the clearance 21 be 7 μm or so.

By narrowing the said clearance it is made possible to increase the fine particles discharging velocity, whereby the agglomeration of the fine particles can be prevented to a greater extent.

The amount of the fine particles discharged depends on the width of the clearance 21, which width is adjusted by adjusting the internal pressure of the cylindrical body and by selecting a suitable shape of the valve means and that of the inner wall of the funnel nozzle.

Thus, once the clearance 21 of the distance, d, which permits the fine particles to pass therethrough is formed between the valve means 16 and the funnel nozzle 14, the fine particles 24 pass through the clearance 21 which is annular, then through the fine tube nozzle 20, then are discharged from the nose portion of the nozzle, strike softly onto the substrate 22 and are dispersed and deposited thereon.

In the clearance 21, not only the fine particles 24 pass therethrough but also a high-speed air current is created toward the outside, and the valve means 16 is also attracted downward and pushed against the inner wall of the funnel nozzle 14 by virtue of a negative pressure induced by the high-speed air current. Consequently, with narrowing in the width of the clearance 21, coupled with decrease in the air current velocity, the fine particles 24 jam in the clearance 21, so that the clearance is blocked and the fine particles are no longer discharged from the nose portion of the funnel nozzle 14.

Thereafter, the valve means 16 which has been pushed against the inner wall of the funnel nozzle 14 move away from the inner wall of the funnel nozzle 14 by virtue of an elastic force of the inner wall and/or the valve means 16, so that the clearance 21 is formed again and the fine particles 24 are discharged therethrough.

By the repetition of such formation and blocking of the clearance 21, the fine particles 24 are discharged toward the substrate without agglomeration.

According to the fine particles dispersing apparatus 10 of this embodiment, since the distance for passage of the fine particles 24 between the valve means 16 and the inner wall of the funnel nozzle 14 is a distance which permits the fine particles to pass one by one, the fine particles are discharged from the nose portion of the nozzle in a dispersed state without agglomeration and thus the particles are dispersed in a satisfactory state on the substrate.

Further, since the dispersion of the fine particles does not rely on the suspension and diffusion based on gravity-drop of the particles, the nose portion of the fine particles discharging nozzle can be drawn extremely close to the substrate. Consequently, it becomes possible, for example, to make control so as to deposit fine particles partially on the substrate as necessary.

For example, in the case where the fine particles dispersing apparatus 10 is used as a gap spacer dispersing apparatus for a liquid crystal display, the distance, h, between the nose portion of the nozzle 20 and the substrate 22 can be set at 10 mm or so and the particles spread range, indicated at w, can be set at 10 mm or so.

Therefore, when the substrate is warped, the fine particles can be deposited at a desired density onto a desired place by making adjustments such as depositing the fine particles partially in a larger proportion or a smaller proportion.

Besides, since the fine tube nozzle 20 is provided, the fine particles 24 can be dispersed in a higher speed of air current and it is possible to make the amount of fine particles discharged smaller or make the particles discharge range narrower, whereby desired surface density distribution and spreadability are improved.

Since the fine particles present within the cylindrical body are oscillated continually due to a change in internal pressure, it is possible to prevent agglomeration of the particles in the cylindrical body.

Moreover, since the fine particles are not suspended and since the distance between the nozzle and the substrate is short, it is possible to disperse most of the discharged fine particles effectively onto the substrate and thus the efficiency of use of the fine particles is extremely high.

Further, since the fine particles are not agglomerated, it is not necessary to disperse the fine particles in a solvent and neither liquid flon nor water need be used. Thus, there is no environmental problem; besides, such devices as a heater and a blower are not required. With such an extremely simple construction, it is possible to attain reduction of both size and cost. And it is not necessary to take long the distance between the nozzle and the substrate for the dispersion of fine particles, a further reduction of size can be attained.

Additionally, since it is not necessary to exhaust the residual fine particles at every replacement of the substrate, not only the working time required for the dispersion of fine particles is short, but also it is possible to effect continuous operation, which point is very advantageous in industrial production.

[Embodiment 2]

Figure 2:
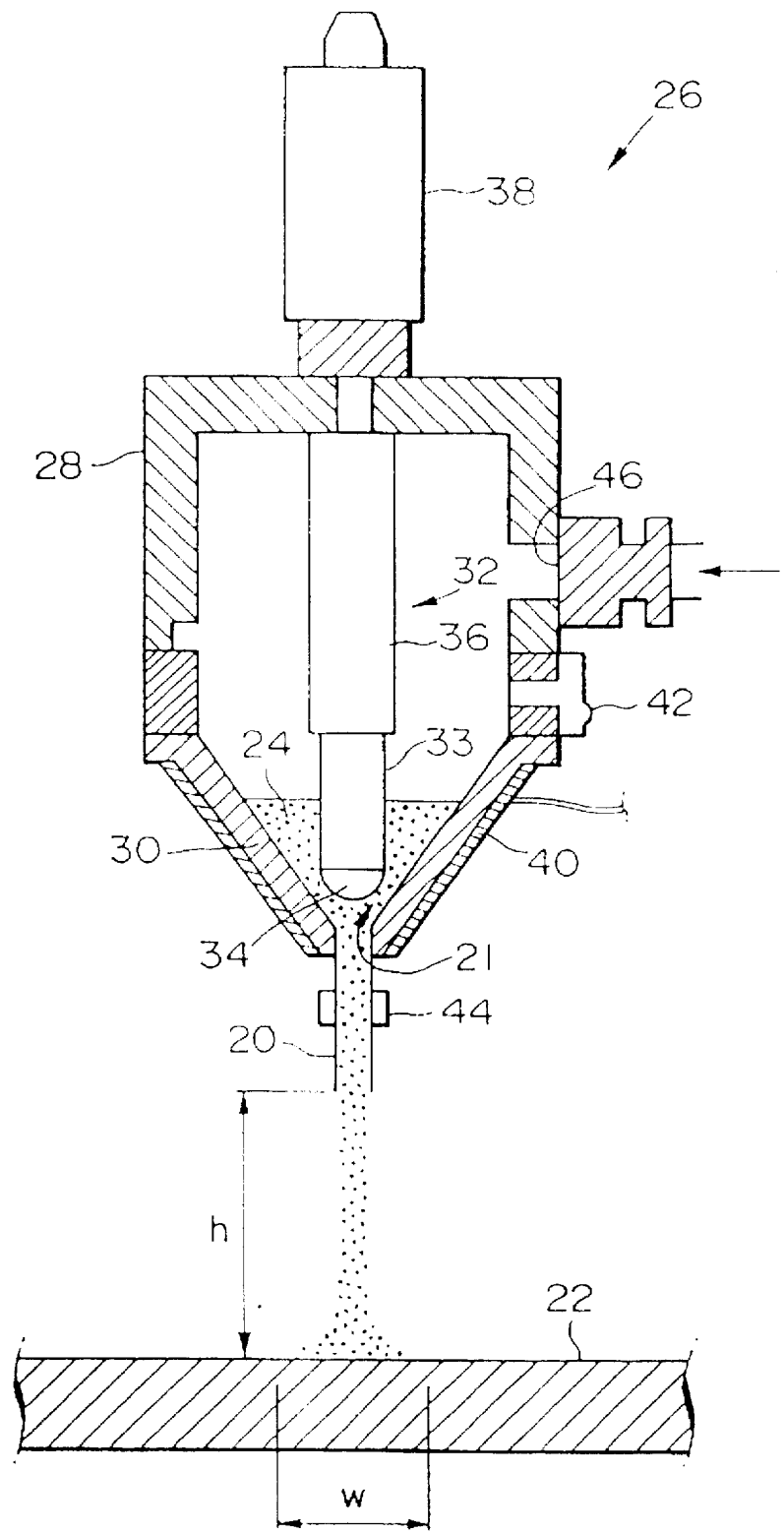
FIG. 2 is a sectional side view of a fine particles dispersing apparatus according to a second embodiment of the invention.

A fine particles dispersing apparatus 26 shown in FIG. 2 substantially comprises a cylindrical body 28, a funnel nozzle 30 formed integrally at the bottom of the cylindrical body 28, and a valve means 32 disposed inside the funnel nozzle 30.

In the fine particles dispersing apparatus 26, the valve mean 32 substantially comprises a piezo-electric element 33, a semispherical clearance forming member 34 provided at one end of the piezo-electric element 33, and a piezo-electric support member 36 provided at the opposite end of the piezo-electric element.

The piezo-electric element 33 fulfills two functions. The first function is to adjust the applied voltage to adjust the clearance. The second function is to perform a high-frequency drive of a very small amplitude, with the said adjusted voltage as bias, to fluidize the fine particles present near the valve portion.

In such oscillation of a very small amplitude, the spherical support portion or the funnel nozzle is oscillated to create resonance at an oscillation mode suitable for the fluidization of fine particles. As a result, the fluidization can be realized by a slight change in voltage.

The piezo-electric element 33 as an oscillating means, upon application of a voltage thereto, repeats expansion and contraction slightly and vertically. As a result of oscillation of the clearance forming member 34 induced by the piezo-electric element 33, fluidity is imparted to the fine particles present around the clearance forming member 34.

The piezo-electric element 33 is provided with an electrode (not shown), and by means of wiring passing through the piezo-electric element support member 36 the said electrode is connected to a piezo-electric element controller 38 provided at the upper portion of the cylindrical body 38. The piezo-electric element controller 38 is for controlling the oscillation of the piezo-electric element and it sets the amplitude and cycle of the oscillation.

In this embodiment, the funnel nozzle 30 is formed by a cone of SUS or the like. Over the outer peripheral surface of the funnel nozzle 30 is mounted a piezo-electric element 40 as an oscillating means. The piezo-electric element 40 is for oscillating the funnel nozzle 30, and though not shown, there are disposed components for the oscillation such as an electrode and a piezo-electric controller.

In the upper side wall portion of the cylindrical body 28 is formed an air inlet 46, and pulse air fed from a pressure regulator means (not shown) flows through the air inlet 46 into the cylindrical body. Air is fed intermittently from the pressure regulator means into the cylindrical body 28 and is discharged, whereby the internal pressure of the cylindrical body is varied.

A large amount of fine particles 24 are present inside the funnel nozzle 30 and around the valve means 32.

At the nose portion of the funnel nozzle 30 is provided a fine tube nozzle 20 which faces a substrate 22 to disperse the fine particles 24 onto the surface of the substrate. By making the diameter of the fine tube nozzle 20 very small (say, 200 μm in inside diameter), it is possible to increase the fine particles discharge.

A pressure sensor 42 is provided in the side wall of the cylindrical body 28. The pressure sensor 42 is for sensing the internal pressure of the cylindrical body 28, and by feeding information obtained from the pressure sensor 42 back to the pressure regulator means it is made possible to maintain the internal pressure of the cylindrical body at an appropriate level.

In the fine particles dispersing apparatus 26 of this embodiment, a particle quantity monitor 44 is attached to the fine tube nozzle 20. The monitor 44 is for detecting the quantity of fine particles 24 passing through the nozzle 20, and by feeding information obtained from the monitor 44 back to the piezo-electric controller or the pressure regulator means it is possible to maintain at an appropriate value the quantity of fine particles 24 dispersed onto the substrate 22.

In using the fine particles dispersing apparatus 26 of this embodiment, first the piezo-electric elements 33 and 40 are oscillated. As a result, fluidity is imparted to the fine particles and it becomes easier for the fine particles to enter an annular clearance 21 which is formed between the inner wall of the funnel nozzle 30 and the clearance forming member 34 of the valve means 32 with the clearance forming member as the center. The width of the clearance 21 is suitably controlled by means of, for example, a pressure regulator means or a piezo-electric element controller.

In this way, between the clearance forming member 34 of the valve means 32 and the funnel nozzle 30 there is formed the clearance 21 whose width corresponds to a distance permitting the passage of fine particles therethrough. The fine particles pass through the clearance 21, then through the fine tube nozzle 20, then are discharged from the nose portion of the nozzle and are dispersed and deposited onto the substrate 22. Also thereafter, with a change in internal pressure of the cylindrical body 28 caused by the pressure regulator means and the oscillation of the piezo-electric elements 33 and 40, the surrounding fine particles flow toward the clearance.

Thus, with a change in internal pressure of the cylindrical body 28 and oscillation of the piezo-electric elements 33 and 40, the fine particles 24 present inside the funnel nozzle 30 pass through the clearance 21 at high speed without agglomeration and are discharged.

According to the fine particles dispersing apparatus 26 of this embodiment, like the apparatus 10 of the first embodiment, the fine particles 24 are dispersed without agglomeration and discharged from the nose portion of the nozzle, so the state of their dispersion on the substrate is good.

Besides, since the dispersion of fine particles does not rely on the suspension and diffusion based on gravity-drop of the particles, the nose portion of the fine particles discharging nozzle can be drawn extremely close to the substrate. For example, therefore, it becomes possible to make control so as to deposit fine particles partially on the substrate as necessary.

Seeing that not only the internal pressure of the cylindrical body varies but also the piezo-electric element 33 oscillates, the fine particles present within the cylindrical body are oscillated continually and are thereby prevented from being agglomerated.

Moreover, since the fine particles are not suspended and the distance between the nozzle and the substrate is short, most of the discharged fine particles can be dispersed effectively onto the substrate and thus the efficiency of use of the fine particles is extremely high.

Further, since the fine particles are not agglomerated, it is not necessary to keep the fine particles dispersed in a solvent nor is it necessary to use liquid flon or even water. Accordingly, there will arise no environmental problem, nor is it necessary to provide any such devices as a heater and a blower, and thus with an extremely simple construction, it is possible to attain the reduction of both size and cost. And a further reduction of size can be attained because it is not necessary to take long the distance between the nozzle and the substrate for the dispersion of fine particles.

Moreover, since it is not necessary to exhaust the residual fine particles at every replacement of the substrate, not only the working time required for dispersing the fine particles is short, but also it is possible to perform a continuous operation. This is very advantageous in industrial production.

Further, since the particle quantity monitor 44 is used in this embodiment, it is possible to prevent excess or deficiency of the fine particles deposited on the substrate.

Although in the fine particles dispersing apparatus 26 shown in FIG. 2 the clearance forming member 34 and the funnel nozzle 30 are provided with the piezo-electric elements 33 and 40, respectively, there may be adopted a construction using either the piezo-electric element 33 or 40 alone.

[Embodiment 3]

Figure 3:
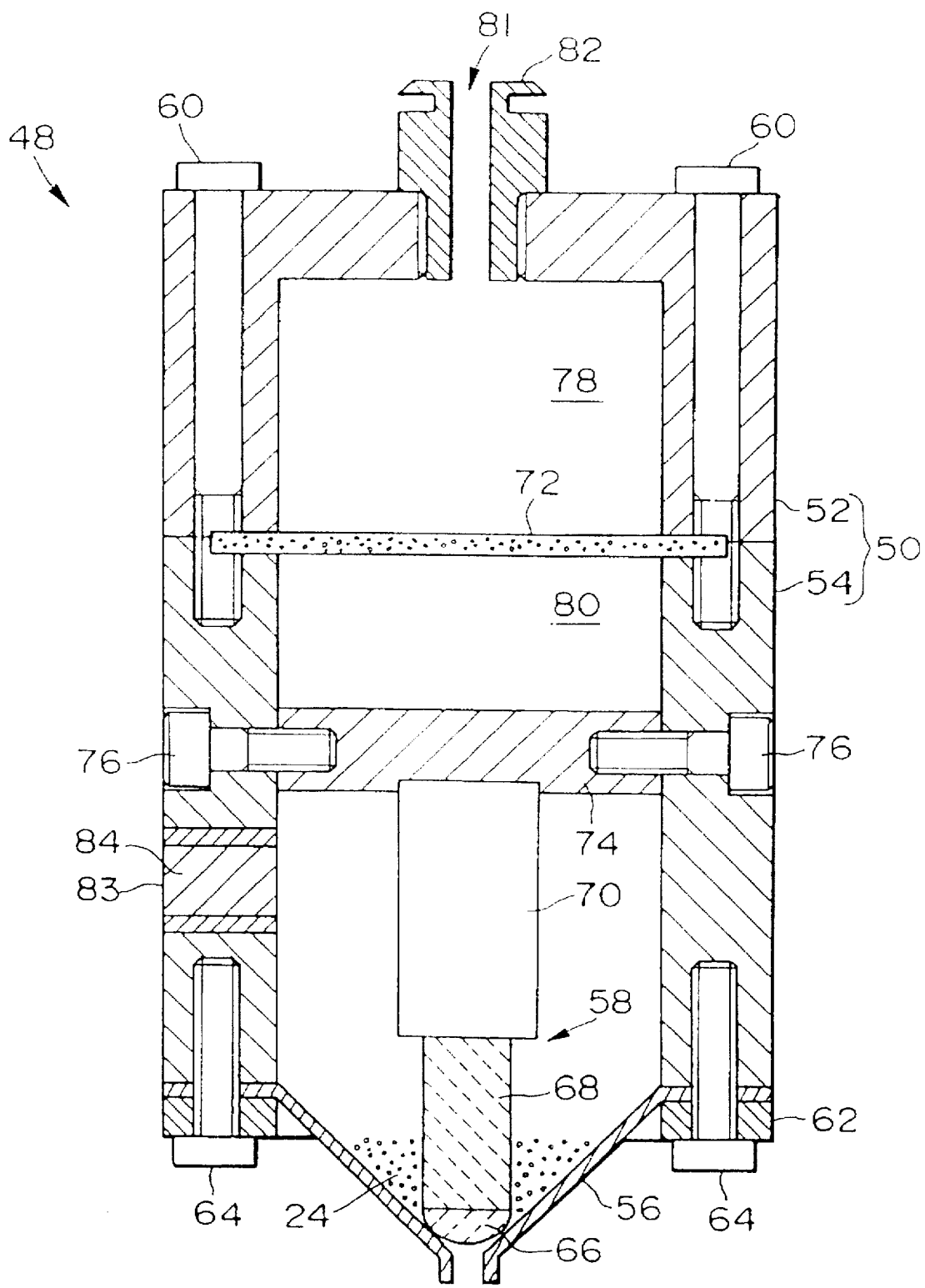
FIG. 3 is a sectional side view of a fine particles dispersing apparatus according to a third embodiment of the invention.

A fine particles dispersing apparatus 48 shown in FIG. 3 substantially comprises a cylindrical body 50, a funnel nozzle 56 provided at the bottom of the cylindrical body 50, and a valve means 58 disposed inside the nozzle 56.

The cylindrical body 50 comprises an upper cylindrical body 52 and a lower cylindrical body 54 which are coupled together using bolts 60.

A mortar-like funnel nozzle 56 is fixed to the bottom of the lower cylindrical body 54 with bolts 64 in a sandwiched fashion between the said bottom and a mounting ring 62.

In this embodiment, the valve means 58 substantially comprises a clearance forming member 66 which is in close proximity to the inner wall of the funnel nozzle 56 to form clearance between it and the said inner wall, a piezo-electric element 68 for oscillation provided with the clearance forming member 66 as well as a piezo-electric element 70 for the adjustment of height, and diaphragm 72.

The clearance forming member 66 is not specially limited if only the surface thereof is smooth and harder than at least the fine particle 24 so as to permit easy passing of the particles.

The piezo-electric element 70 for the adjustment of height is supported by a transverse member 74 which is fixed with bolts 76 to the lower cylindrical body 54. The piezo-electric element 70 is larger in displacement than the piezo-electric element 68 for oscillation and it adjusts the clearance between the clearance forming member 66 and the inner wall of the funnel nozzle 56 to a suitable width.

In the case of using this fine particles dispersing apparatus as a gap spacer dispersing apparatus for a liquid crystal display, a suitable displacement of the oscillating piezo-electric element 68 is about 1 to 3 μm and that of the height adjusting piezo-electric element is about 17.5 μm.

The diaphragm 72 (preferably 1 mm or so in thickness) is capable of pressure transfer and formed of an elastic material such as rubber. A vertical deflection of the diaphragm 72 causes a change in internal pressure of a lower chamber 80 formed below the diaphragm in accordance with the internal pressure of an upper chamber 78 formed above the diaphragm.

In the upper portion of the upper cylindrical body 52 is provided an air attachment 82 formed with an inlet 81, and a pressure regulator means (not shown) for the feed and discharge of pulse air with respect to the interior of the cylindrical body 50 is attached to the air attachment 82.

In the side wall of the lower chamber 80 is formed a fine particles replenishing port 83. While the fine particles dispersing apparatus 48 is in use, the replenishing port 83 is sealed with a plug 84, but when the fine particles are to be replenished into the cylindrical body 50, the plug 83 is removed and an appropriate amount of fine particles are replenished into the interior through the replenishing port 83, followed by sealing with the plug 84.

In using the fine particles dispersing apparatus 48 of this the third embodiment, the piezo-electric elements 70 and 68 are oscillated and at the same time the diaphragm 72 is oscillated by the pressure regulator means attached to the air attachment 82 to render the internal pressure of the lower chamber 80 negative, thereby imparting fluidity to the fine particles present around the clearance forming member 66.

In this case, the oscillating piezo-electric element 68 smaller in displacement can mainly adjust the number of oscillations and amplitude for fluidity impartment in accordance with the size and material of the fine particles, while the height adjusting piezo-electric element 70 larger in amplitude can mainly adjust the width of the clearance.

The piezo-electric elements 68 and 70 are each controlled properly by means of a piezo-electric controller (not shown) or the like connected thereto.

In this way the fine particles 24 pass through the clearance formed between the clearance forming member 66 of the valve means 58 and the funnel nozzle 56 which clearance is of a distance permitting the passage of fine particles therethrough, then are discharged from the clearance and dispersed and deposited on the substrate.

Thereafter, with a pressure change transferred from the upper chamber 78 to the lower chamber 80 and with oscillation of the piezo-electric element 68, the fine particles 24 present inside the funnel nozzle 56 pass through the clearance at high speed without agglomeration and are discharged.

According to the fine particles dispersing apparatus 48 of the third embodiment, like the apparatus of the first embodiment described previously, the fine particles 24 are dispersed without agglomeration and discharged from the nose portion of the nozzle, so that there is attained a satisfactory state of particles dispersion on the substrate.

Since the dispersion of fine particles does not rely on the suspension and diffusion based on gravity-drop of the particles, the nose portion of the fine particles discharging nozzle can be brought to a position extremely close to the substrate. Therefore, it becomes possible to make control so as to deposit fine particles partially on the substrate as necessary.

Moreover, it is not that the fine particles are suspended, and the distance between the nozzle and the substrate is short. Therefore, most of the fine particles discharged can be dispersed effectively on the substrate and thus the efficiency of use of the fine particles is extremely high.

Further, since the fine particles are not agglomerated, it is not necessary to keep the fine particles dispersed in a solvent, and neither liquid flon nor water need be used. Accordingly, there is no environmental problem, nor is it necessary to use such devices as a heater and a blower. Thus, with an extremely simple construction, it is possible to attain the reduction of size and cost. A further reduction of size can be attained because it is not necessary to take long the distance between the nozzle and the substrate for the dispersion of fine particles.

Moreover, since it is not necessary to exhaust the residual fine particles at every replacement of the substrate, not only the working time required for the dispersion of fine particles is short but also it is possible to perform a continuous operation. This is very advantageous in industrial production.

The width of the clearance can be adjusted with an extremely high accuracy by controlling the piezo-electric element 70, whereby the fine particles agglomeration preventing effect can be further enhanced.

Further, if the diaphragm 72 for partitioning the interior of the cylindrical body 50 into upper and lower chambers 78, 80 as in this embodiment, it is possible to prevent the back flowing phenomenon of the fine particles from the inlet port 81 toward the pressure regulator means when the pressure is changed by the pressure regulator means.

Since the use of the diaphragm permits the supply of air into the lower chamber 80 only in an amount sufficient to induce a pressure change in the same chamber, it is possible to reduce the amount of air fed and thus there is attained high efficiency.

It also becomes possible to adjust the pressure change in the lower chamber 72 with a higher accuracy.

When the discharge of fine particles is stopped, a small amount of fine particles present below the clearance forming member 66 may be discharged as unnecessary fine particles. However, if the foregoing diaphragm is used, the internal pressure of the lower chamber 80 becomes negative and the residual fine particles are drawn back to the lower chamber 80 side. Thus, it is possible to suppress the discharge of such unnecessary discharge of fine particles.

The use of the diaphragm is further advantageous in that when the pressure change in the cylindrical body 50 by the pressure regulator means is stopped, it is possible to stop the pressure change in the lower chamber 80 in a shorter time and thus the time lag in stopping the discharge of fine particles 24 can be diminished.

[Embodiment 4]

Figure 4:
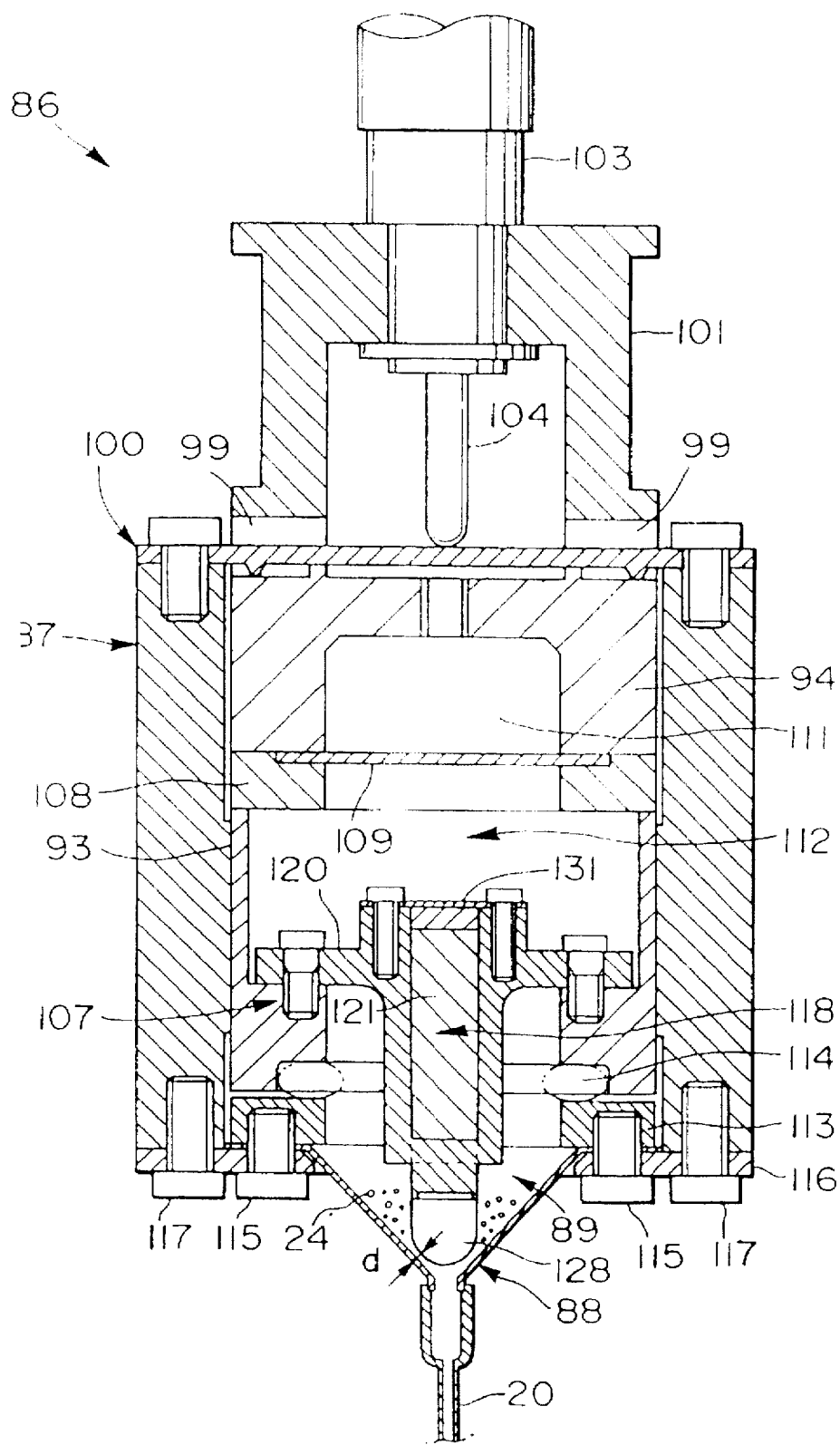
FIG. 4 is a sectional side view of a fine particles dispersing apparatus according to a fourth embodiment of the invention.
Figure 5:
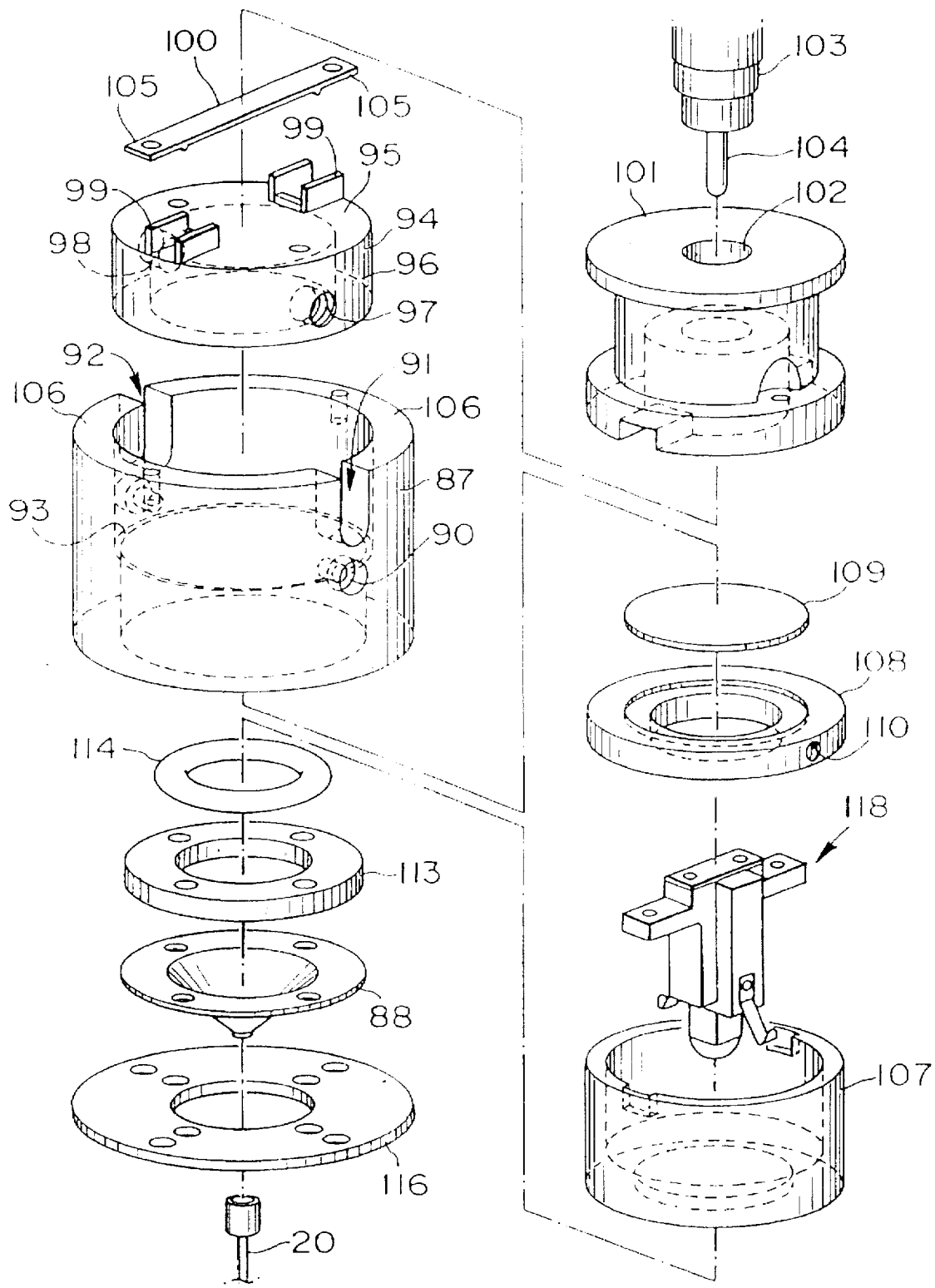
FIG. 5 is an assembly/disassembly diagram of the fine particles dispersing apparatus of the fourth embodiment.
Figure 6:
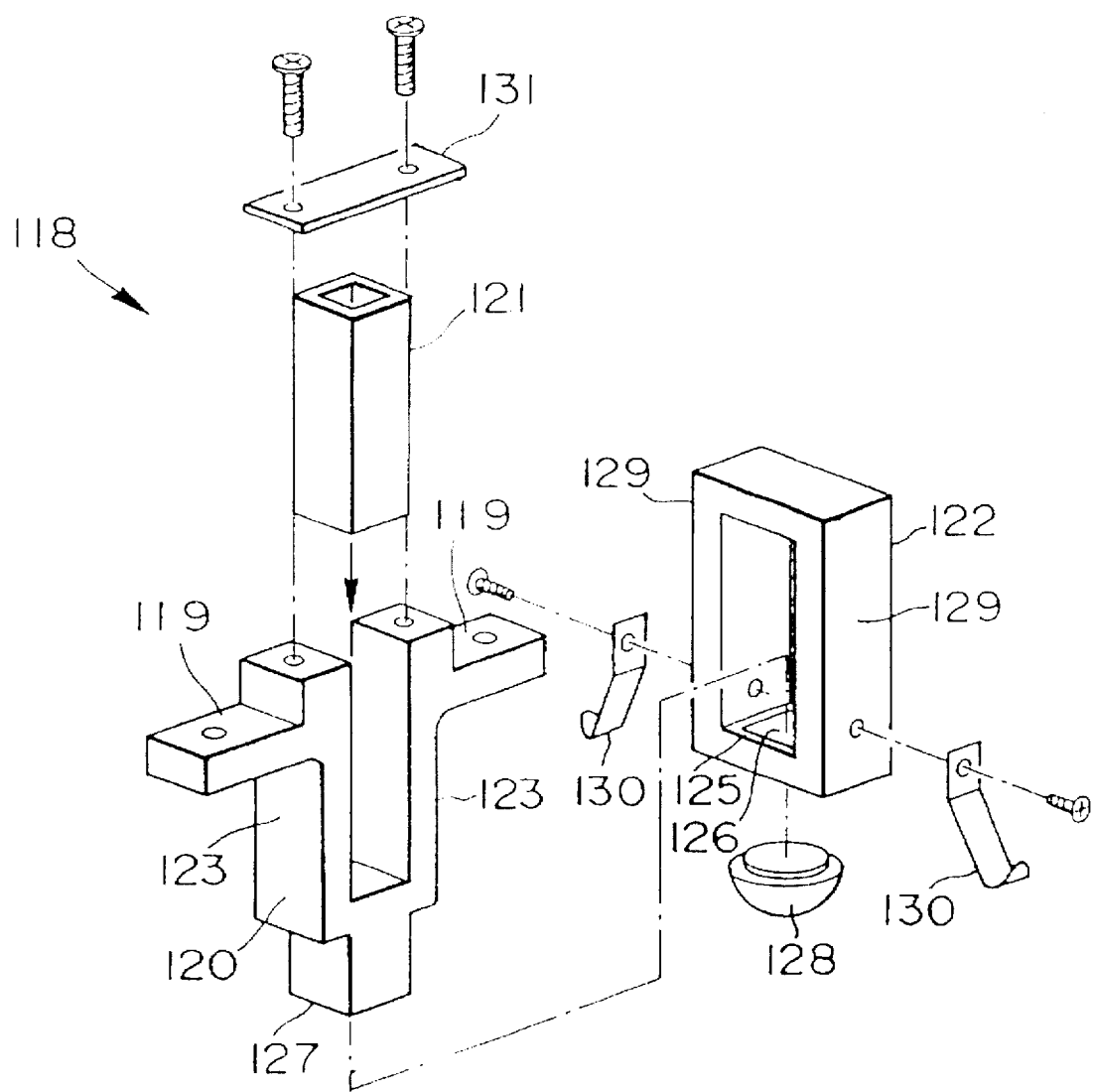
FIG. 6 is an assembly/disassembly diagram of a valve mechanism used in the apparatus of the fourth embodiment.

A fine particles dispersing apparatus 86 shown in FIGS. 4 to 6 substantially comprises an outer cylinder 87 which is a cylindrical body, a funnel nozzle 88 provided at the bottom of the outer cylinder 87, and a valve means 89 disposed inside the funnel nozzle 88.

In the side wall of the outer cylinder 87, as shown in FIG. 5, there are formed a fine particles replenishing port 90, an air supply slit 91 and a pressure sensor slit 92. Further, a reduced-diameter portion 93 is formed in the lower portion of the interior of the outer cylinder 87.

An upper cylinder 94 is fitted in the upper portion of the outer cylinder 87. The upper cylinder 94 comprises a disk-like cover portion 95 and a cylindrical side wall portion 96. In the side wall portion 96 are formed an air supply hole 97 and a pressure sensor hole 98.

On the upper surface of the cover portion 95 are formed upwardly projecting mounting portions 99, in which is fitted a generally rectangular presser plate 100.

Further, on top of the upper cylinder 94 is provided a closure member 101. In the closure member 101 is formed a through hole 102, into which is mounted a micrometer 103 in such a manner that the lower end of a micrometer head 104 of the micrometer 103 thus mounted comes into abutment with the presser plate 100.

When the upper cylinder 94 is fitted in the outer cylinder 87, since the length of the presser plate 100 is larger than the diameter of the upper cylinder 94, the upper cylinder gets into the outer cylinder 87, and both ends 105, 105 of the presser plate 100 come into abutment with side wall end faces 106 of the outer cylinder 87 and are fixed with bolts or the like.

At this time, it is necessary to take care so that the air supply hole 97 of the upper cylinder 94 and the air supply slit 91 of the outer cylinder 87 are in communication with each other and so that a like communication is provided between the pressure sensor hole 98 of the upper cylinder 94 and the pressure sensor slit 92 of the outer cylinder 87.

An inner cylinder 107 is disposed in the lower portion of the interior of the outer cylinder 87, and a valve mechanism 118 which will be described later is mounted in the inner cylinder 107. Further, a diaphragm 109 is mounted on top of the inner cylinder 107 through an annular cylinder 108. The annular cylinder 108 has a fine particles replenishing port 110 formed in the side wall thereof and it is fixed to the inner cylinder 107 using a connecting means such as bolts or the like.

The inner cylinder 107 is disposed within the outer cylinder 87 so as to provide communication between the fine particles replenishing port 110 of the annular cylinder 108 and the fine particles replenishing port 90 of the outer cylinder 87, then the diaphragm 109 is held between the annular cylinder 108 and the upper cylinder 94. As a result, an upper chamber 111 is defined by both the upper surface of the diaphragm 109 and the upper cylinder 94, while a lower chamber 112 is defined by the lower surface of the diaphragm 109, the inner cylinder 107 and the funnel nozzle 88.

In this case, the upper chamber 111 is in communication with the exterior through the air supply hole 97 and the pressure sensor hole 92, while the lower chamber 112 communicates with the exterior through the fine particles replenishing ports 90 and 110 which are in communication with each other.

When the fine particles are to be fed to the fine particles dispersing apparatus 86, the replenishing ports 90. and 110 serve as fine particles intake ports, while when the supply of fine particles is not to be performed, the replenishing port 110 is sealed with a plug (not shown).

The funnel nozzle 88, which is provided with a fine tube nozzle 20 at the nose portion thereof, is attached to the lower portion of the outer cylinder 87 through an O-ring 114 or an O-ring collar 113 and is fixed with a cone ring 116. The funnel nozzle 88 and the O-ring collar 113 are fixed together using connecting means 115 such as bolts. Likewise, the cone ring 116 and the lower end face of the outer cylinder 87 are fixed together using connecting means 117 such as bolts.

The valve mechanism 118, which is mounted to the inner cylinder 107 and serves as an oscillating means, is substantially constituted by a combination of a generally U-shaped base 120 having outwardly extending shoulder portions 119, a piezo-electric element 121 and a frame 122, as shown in FIG. 6.

Two side walls 123, 123 and a bottom portion 124 of the base 120 have such respective sizes and shapes as to permit the piezo-electric element 121 to be fitted in the portion defined by them. Further, a frame 122 is combined with the base 120 so as to enclose therein the piezo-electric element 121 thus fitted in the portion.

An insertion opening 126 is formed in a bottom portion 125 of the frame 122, and a projecting portion 127 projecting from the underside 124 of the base 120 is inserted into the insertion opening 126 when the base 120 and the frame 122 are combined together. Further, a semispherical clearance forming member 128 is formed at the lower end of the projecting portion 127 extending from the inside to the outside through the insertion opening 126.

Flexible support pieces 130, 130 are attached to side walls 129, 129 of the frame 122 to prevent a positional deviation of the frame 122.

A fixing plate 131 is fixed to the thus-combined base 120 and frame 122.

The shoulder portions 119, 119 of the base 120 are secured to the inner cylinder 107 using connecting means such as bolts or the like, whereby the valve mechanism 118 is held within the inner cylinder.

Figure 7:
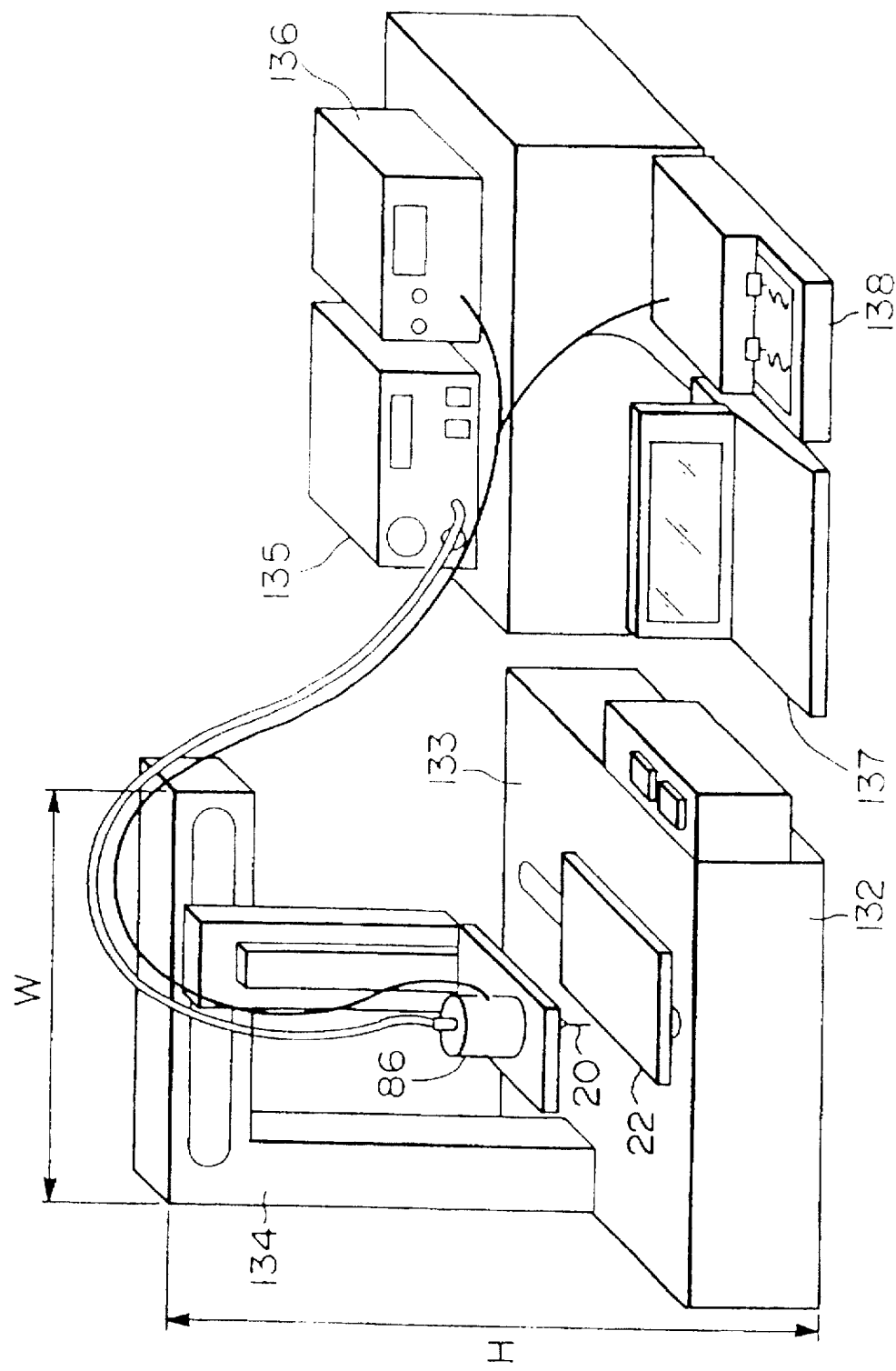
FIG. 7 is a perspective view of peripheral equipment disposed around the fine particles dispersing apparatus of the fourth embodiment.

The fine particles dispersing apparatus 86 is used together with various peripheral devices such as those shown in FIG. 7 for example. As illustrated therein, the apparatus 86 is mounted in a work machine 132 which substantially comprises a base board 133 and a work hand 134. A substrate on which fine particles are to be dispersed is placed on the base board 133.

The work hand 134 with the fine particles dispersing apparatus 86 mounted thereto is for moving the apparatus 86 in the longitudinal, transverse or vertical direction up to a suitable position to maintain the apparatus and the substrate 22 on the base board 133 in an optimal relative positional relation.

Of course, it is also a preferred mode of operation that the positional relation of the substrate 22 and the fine particles dispersing apparatus 86 relative to each other is adjusted by moving the substrate 22 on the base board 133.

The air supply hole 97 of the fine particles dispersing apparatus 86 is connected to an air controller 135, while an electrode (not shown) provided in the piezo-electric element 121 of the valve mechanism 118 is connected to a piezo-electric element controller 136. Though not shown, moreover, the pressure sensor hole is connected to a pressure sensor, and the air controller 136, piezo-electric element controller 136 and pressure sensor are connected to a central controller 137, whereby there is made a unified control.

In this embodiment, a pressure regulator means is constituted by such air controller 135 and pressure sensor.

To the central controller 137 is connected a printer 138 for the recording of various data including pressure and discharge current.

In using the fine particles dispersing apparatus 86 of this the fourth embodiment, first the presser plate 100 is pressed to finely adjust the position of the outer cylinder 87 so as to give an optimum clearance by means of the micrometer 103 provided at the top of the apparatus 86.

Then, the internal pressure of the upper chamber 111 is varied by means of the air controller 135 and at the same time the piezo-electric element 121 is oscillated by the piezo-electric element controller 136. As a result, the fine particles 24 pass through the clearance and are discharged and dispersed and deposited on the substrate 22.

Thereafter, with a pressure change in the lower chamber 112 transferred from the upper chamber 111 through the diaphragm 109 and with oscillation of the piezo-electric element 121, the fine particles are given fluidity continuously. Consequently, the fine particles 24 present inside the funnel nozzle 128 pass through the clearance at high speed without agglomeration and are discharged.

The internal pressure of the upper chamber 111 is sensed continually by the pressure sensor, and on the basis of pressure data obtained the central controller 137 controls the air controller 135 and the piezo-electric element controller 136, followed by feedback of information, whereby a control can be made so as to always provide optimum pressure and oscillation of the piezo-electric element.

According to the fine particles dispersing apparatus 86 of this embodiment, like the apparatus 10 of the first embodiment described previously, the fine particles 24 are dispersed without agglomeration and discharged from the nose portion of the nozzle, thus affording a satisfactory dispersed state of particles on the substrate.

Particularly, the use of the fine tube nozzle 20 permits the fine particles to be discharged at a higher speed and hence agglomeration if any can be broken down, whereby the state of particles dispersion can be improved to a greater extent.

Moreover, since the dispersion of fine particles does not rely on suspension and diffusion based on gravity-drop of the particles, it is possible to position the nose portion of the fine particles discharging nozzle in close proximity to the substrate. For example, therefore, it becomes possible to make control so as to deposit fine particles partially on the substrate as necessary.

Further, since it is not that the fine particles are suspended and since the distance between the nozzle and the substrate is short, most of the fine particles discharged can be dispersed effectively onto the substrate and the discharge of fine particles can be done stably in a constant amount required. Thus, the efficiency of use of the fine particles is extremely high. In the apparatus of this embodiment, the efficiency of use can be 50% or so, thus permitting great reduction of the material cost (20% of that in the prior art).

Since the fine particles are difficult to agglomerate, it is not necessary to keep the fine particles dispersed in a solvent, and neither liquid flon nor water need be used. Therefore, no problem arises from the environmental standpoint, and it is not necessary to use such devices as a heater and a blower. Thus, with an extremely simple construction, it is possible to attain the reduction of both size and cost. Besides, since it is not necessary to take long the distance between the nozzle and the substrate for the dispersion of fine particles, it is possible to attain a further reduction of size.

For example, in the case of forming gap spacers in a liquid crystal display, the height H and width W of the work machine 132 in FIG. 7 can be set at about 50 cm and about 40 cm, respectively. Thus, an epoch-making reduction of size not attained so far can be realized.

Moreover, it is not necessary to exhaust the residual fine particles at every replacement of the substrate and hence not only the working time for the dispersion of fine particles is short but also it is possible to perform a continuous operation using the working machine 132 as part of a production line. This is very advantageous in industrial production.

Further, since the width of the clearance can be adjusted by controlling the piezo-electric element 121, it is possible to control the discharge of the fine particles 24 more minutely.

Particularly, the amount of fine particles discharged can be made much smaller. The minimum amount of fine particles deposited on the substrate has heretofore been 0.3 mg or so, while according to the fine particles dispersing apparatus of this embodiment, it can be made 0.0001 mg or so.

In this embodiment, moreover, the diaphragm 109 which partitions the interior of the outer cylinder 87 into upper and lower chambers 111, 112 is provided, so when the internal pressure is made negative by the pressure regulator means, it is possible to prevent the back flow phenomenon of the fine particles from the air supply hole 97 or pressure sensor hole 98 toward the air controller 135 or the pressure sensor.

In the presence of the diaphragm 109, moreover, the lower chamber 112 is supplied with air only in an amount sufficient to induce a pressure change, so it is possible to decrease the amount of air supplied.

Further, it becomes possible to adjust the pressure change in the lower chamber 112 with a higher accuracy.

When the discharge of fine particles is stopped by the valve means 89, a small amount of fine particles are positioned (for example within the fine tube nozzle 20) below the clearance forming member 128 and those particles may be discharged as unnecessary particles. However, in the fine particles dispersing apparatus using the diaphragm 109, the internal pressure of the lower chamber 112 becomes negative and the residual fine particles are thereby drawn back to the lower chamber 112 side. Thus, it is possible to prevent unnecessary discharge of fine particles.

In the presence of the diaphragm 109, therefore, when the pressure change in the cylindrical body 87 by the pressure regulator means is stopped, it is possible to stop the pressure change in the lower chamber 112 in a shorter time and hence it is possible to diminish the time lag at the time of stopping the discharge of fine particles.

Moreover, the use of the micrometer 103 as in this embodiment permits clearance adjustment of the order of several tens of micrometer which adjustment cannot be made by the use of only the piezo-electric element 121. Therefore, the chamber pressure can be adjusted and it is possible to suitably cope with a change in the kind of fine particles, a change in the density of fine particles to be dispersed, etc. Thus, it is possible to improve the versatility.

[Embodiment 5]

Figure 8:
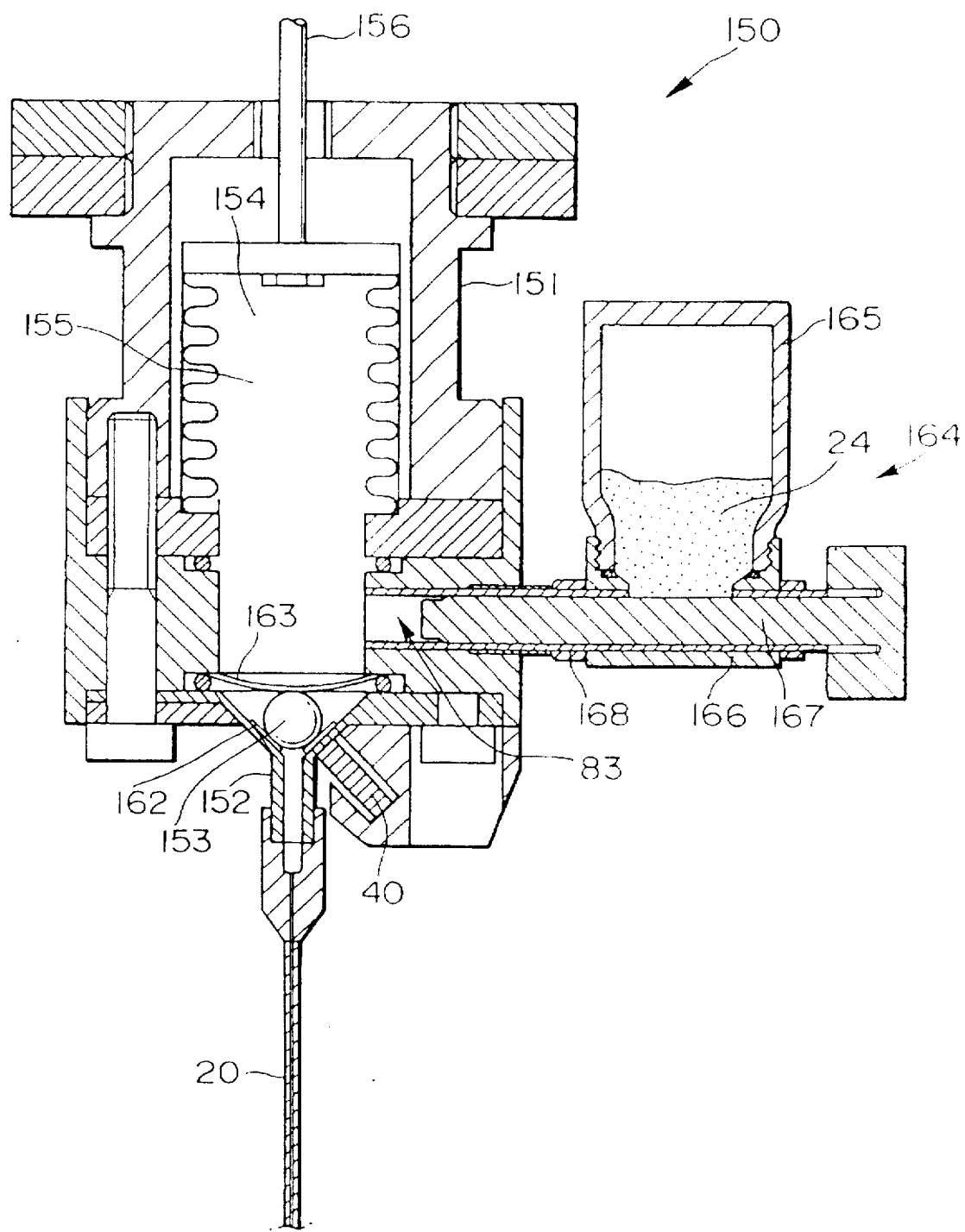
FIG. 8 is a sectional side view of a fine particles dispersing apparatus according to embodiment of the invention.

A fine particles dispersing apparatus 150 shown in FIG. 8 substantially comprises a cylindrical body 151, a funnel nozzle 152 provided at the bottom of the cylindrical body 151, and a valve means 153 which is a spherical clearance forming member disposed inside the funnel nozzle 152.

In the fine particles dispersing apparatus 150 of this embodiment, a bellows 154 having a bellows-like side face and a closed upper portion is disposed within the cylindrical body 151, with a fine particles receiving chamber 155 being thereby defined as a closed space.

As the bellows 154, a metallic bellows is preferred, for example bellows formed of phosphor bronze, stainless steel, or copper.

Figure 9:
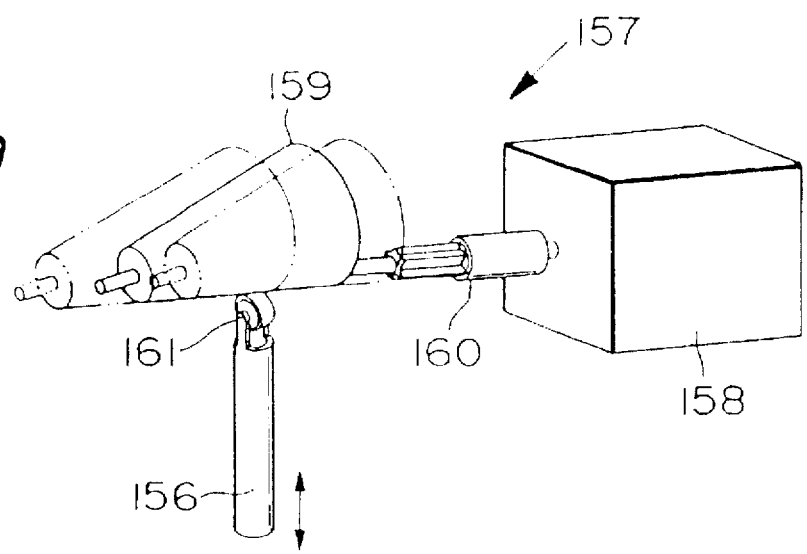
FIG. 9 is a perspective view showing a bellows drive mechanism used in the apparatus of the fifth embodiment.

To the top of the bellows 154 is connected a reciprocating drive rod 156 of such a bellows drive mechanism 157 as shown in FIG. 9.

The bellows drive mechanism 157 substantially comprises a motor 158, an eccentric conical cam 159, a serration connector 160 for connection of the motor 156 and the cam 159, a cam follower 161 adapted to slide on the outer peripheral surface of the cam 159, and the reciprocating drive rod 156 connected to the lower end of the cam follower 161.

According to the bellows drive mechanism 157, the eccentric conical cam 159 performs an eccentric rotary motion through the serration connector 160 upon operation of the motor 158. With this eccentric rotary motion, the reciprocating drive rod 156 connected to the cam follower 161 which is in abutment with the cam 159 repeats reciprocating motions up and down, so that the bellows 154 expands and contracts in the vertical direction to induce a change in internal pressure of the fine particles receiving chamber 155 formed inside the bellows 154. That is, a pressure regulator means for changing the internal pressure of the cylindrical body 151 is constituted by both bellows 154 and bellows drive mechanism 157.

A piezo-electric element 40 as an oscillating means is attached to the outer peripheral surface of the funnel nozzle 152 to oscillate the same nozzle, whereby it is made easy to induce a resonant oscillation mode of the funnel nozzle 152 and fluidity is imparted effectively to the fine particles present inside the funnel nozzle.

In this case, it is effective for the oscillating direction to be perpendicular to the slant face of the funnel nozzle 152. It is possible to create resonance of the funnel nozzle 152 even when the amplitude of the piezo-electric element 40 is small, and therefore a small piezo-electric element driving voltage suffices.

Though not shown, an electrode and a piezo-electric element controller are attached to the piezo-electric element 40.

Figure 10:
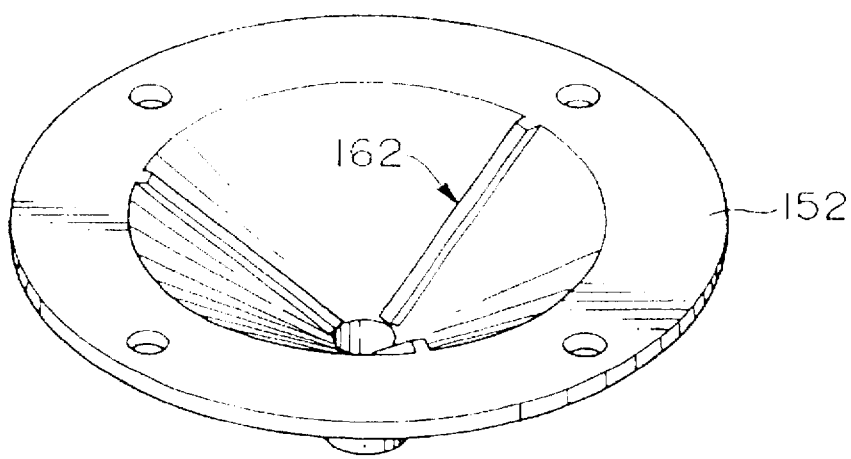
FIG. 10 is a perspective view showing a funnel nozzle used in the apparatus of the fifth embodiment.
Figure 11:
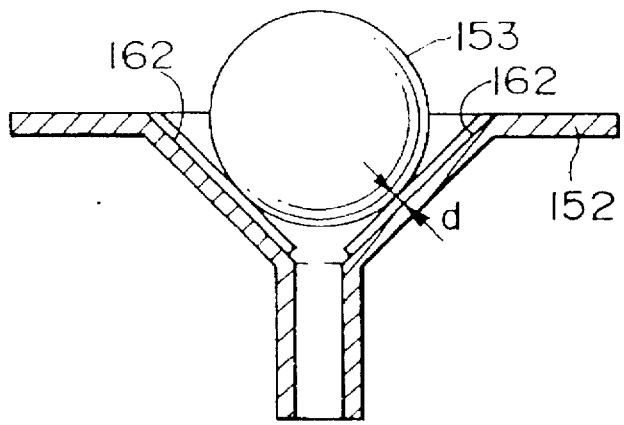
FIG. 11 is a sectional side view thereof.

In the fine particles dispersing apparatus 150 of the fifth embodiment, moreover, such stepped portions 162 as shown in FIGS. 10 and 11 are formed on the inner wall of the funnel nozzle 152. The stepped portions 162 are slightly projecting inwards, and in the illustrated example they are formed radially in three directions. The clearance forming member 153 is placed on the stepped portions 162.

The height of each stepped portion 162 ensures a minimum width (d) of the clearance between the clearance forming member 153 and the inner wall of the funnel nozzle, and a height of 10 μm or so is considered suitable though the height in question also depends on the fine particles used.

In the illustrated example the stepped portions are constituted by three linear portions, but this does not always constitute any limitation. For example, three or more dot-like portions may be formed if only they can hold the clearance forming member 153 so as to maintain a predetermined spacing between the clearance forming member and the inner wall of the funnel nozzle 152.

The stepped portions 162 can hold the clearance forming member 153 centrally of the funnel nozzle 152. For example, the stepped portions 162 can be formed by electric discharge machining.

Although in the illustrated example the stepped portions 162 are formed on the funnel nozzle 152 side, they may be formed on the clearance forming member side. More specifically, by forming projections on the surface of the clearance forming member it is possible to ensure a minimum distance between the clearance forming member and the funnel nozzle. In this case, the stepped portions can also be formed by plating or the like.

In the fine particles dispersing apparatus 150 of this embodiment, moreover, there is provided a clearance control means 163, which is for preventing the distance between the clearance forming member 153 and the funnel nozzle 152 from becoming too large. The clearance control means 163 urges the clearance forming member 153 downward. A spring or such an elastic material as rubber is used. Especially, a wire spring such as a piano wire spring is suitable.

Further, in FIG. 8 there is illustrated a fine particles supply mechanism 164. The fine particles supply mechanism 164 substantially comprises a supply pipe 168 which is inserted into a fine particles replenishing port 83 formed in the lower portion of the side wall of the cylindrical body 151 and in a position higher than the clearance forming member 153; a mounting collar 166 formed on the supply pipe 168; a fine particles supply vessel 165 mounted to the mounting collar; and a push-out rod 167 adapted to reciprocate through the supply pipe 168.

The fine particles supply vessel 165 contains fine particles to be dispersed, and after it has been used and become empty, it is replaced with a like vessel containing fine particles.

The mounting collar 166 can rotate about the axis of the supply pipe 168 integrally with the fine particles supply vessel 165. During operation of the apparatus, the mounting collar 166 is fixed so that the mouth portion of the fine particles supply vessel 165 faces down, while when the vessel 165 is to be removed, it is turned together with the mounting collar 166 until the mouth portion of the vessel faces upward and then the vessel is rotated along the threaded portion and removed. In this state, another vessel 165 which contains fine particles is mounted.

Under the operation of such mechanism, at the time of change from one to another vessel 165, it is not required to turn the vessel upside down, that is, the fine particles do not spill. Further, since the vessel mounting portion of the mounting collar 166 faces down upon removal of the vessel 165, it is possible to prevent suspended dust in air, or the like, from dropping into the supply pipe 168.

The push-out rod 167 is for pushing into the fine particles receiving chamber 155 the fine particles 24 which have been transferred from the fine particles supply vessel 165 into the supply pipe 168. In FIG. 8, by leftward movement of the push-out rod 167 the fine particles are pushed into the chamber 155, and thereafter the rod moves rightward until an end portion thereof moves beyond the vessel 165, allowing the fine particles to be fed into the supply pipe 168, whereupon the rod again moves leftward to push the fine particles into the chamber 155.

In the fine particles dispersing apparatus 150 of this embodiment 5, the fine particles 24 which have been fed from the fine particles supply vessel 165 into the fine particles receiving chamber 155 by means of the push-out rod 167 pass through the clearance formed between the inner wall of the funnel nozzle 152 and the clearance forming member 153 and are discharged from the nose portion of the funnel nozzle 152 through the fine tube nozzle 20.

Since the fine particles are fed suitably from the fine particles supply vessel 165 into the fine particles receiving chamber 155, there is no fear of the operation being stopped due to the lack of fine particles. Besides, all that is required when the fine particles 24 in the vessel 165 have run out is a mere replacement of the vessel 165 with another vessel 165 containing fine particles, and thus there is no fear of delay of the operation.

Moreover, since the stepped portions 162 are formed on the inner wall of the funnel nozzle 162, it is not likely at all that the distance between the clearance forming member 153 and the inner wall of the funnel nozzle 152 will become too narrow, nor is there any likelihood of the clearance becoming too wide because the clearance control means 163 is provided. Thus, an appropriate amount of fine particles are discharged continually.

Further, in the fine particles dispersing apparatus 150 of this embodiment, since there is neither oscillating piezo-electric element nor a sphere position adjusting mechanism in the fine particles receiving chamber 155, it becomes easier to effect the supply of fine particles.

Moreover, since the internal pressure of the fine particles receiving chamber 155 varies with expansion and contraction of the bellows 154 by means of the bellows drive mechanism 157, it is possible to disperse the fine particles.

Particularly, in the apparatus 150 of this embodiment, since a mechanical power source is used for driving the bellows 154, the response characteristic to a change in internal pressure of the fine particles receiving chamber 155 can be quickened.

If the bellows 154 is a metallic bellows, the resonance frequency can be set at 50 Hz or more and it is possible to quicken the jet pulse while maintaining a volumetric change equal to that of a rubber diaphragm.

Further, the funnel nozzle 152 oscillates together with oscillation of the piezo-electric element 40, so that the fine particles 24 are given fluidity.

According to the fine particles dispersing apparatus 150 of this the fifth embodiment, like the apparatus 10 of the first embodiment described previously, since the fine particles 24 are dispersed without agglomeration and discharged from the nose portion of the nozzle, there is attained a good dispersed state of the particles on the substrate.

Moreover, since the fine particles dispersion does not rely on suspension and diffusion based on gravity-drop of the particles, it is possible to position the nose portion of the fine particles discharging nozzle extremely close to the substrate and therefore it becomes possible to make control for partial deposition of the particles on the substrate where required.

Further, since it is not that the fine particles are suspended and since the distance between the nozzle and the substrate is short, it is possible to disperse most of the discharged fine particles effectively onto the substrate. Thus, the efficiency of use of the fine particles is extremely high.

Moreover, since the fine particles do not agglomerate, it is not necessary to keep the particles dispersed in a solvent and hence neither liquid flon nor water need be used. Therefore, no environmental problem arises and it is not necessary to use such devices as a heater and a blower. Thus, with an extremely simple construction, it is possible to attain the reduction of size and cost. Besides, since it is not necessary to take long the distance between the nozzle and the substrate for dispersion of the fine particles, there can be attained a further reduction of the size.

Further, since the residual fine particles are not required to be exhausted at every replacement of the substrate, not only the working time required for the dispersion of fine particles is short but also it is possible to perform a continuous operation. This is very advantageous in industrial production.

[Test Example]

Using the fine particles dispersing apparatus 143 shown above as a conventional apparatus and the fine particles dispersing apparatus 86 of the fourth embodiment described above, gap spacers 6 μm in diameter were spread onto glass substrates and observed for the state of their dispersion.

Figure 12:
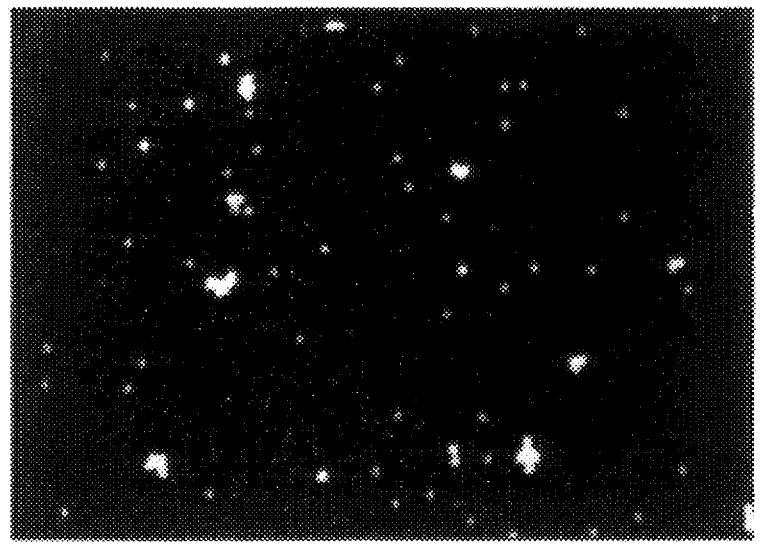
FIG. 12 is a schematic diagram using a photograph which shows the state of fine particles dispersed by a conventional fine particles dispersing apparatus.
Figure 13:
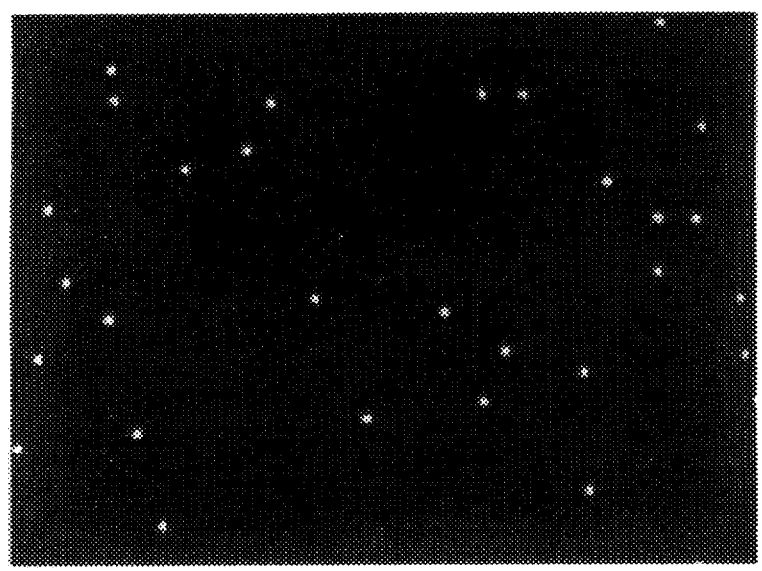
FIG. 13 is a schematic diagram using a photograph which shows the state of fine particles dispersed by the apparatus of the fourth embodiment.
Figure 14:
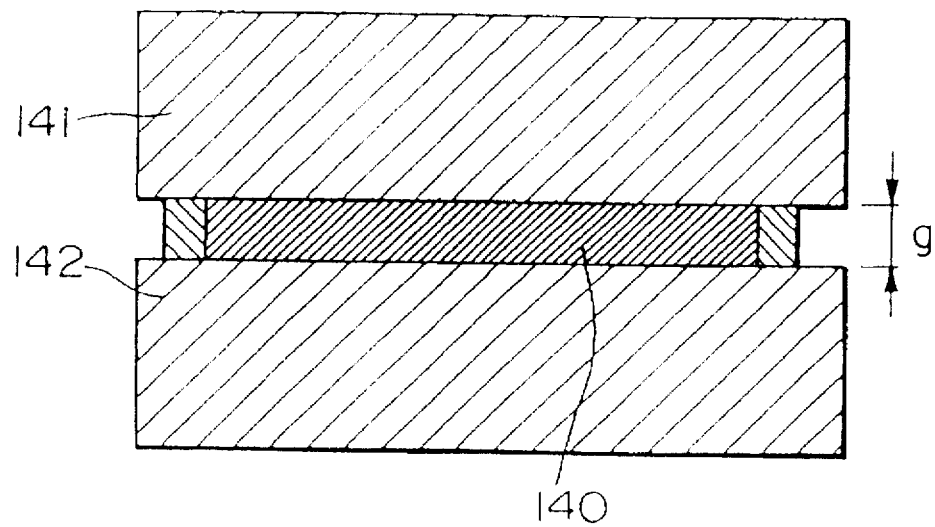
FIG. 14 is a sectional side view showing an outline of a liquid crystal display.
Figure 15:
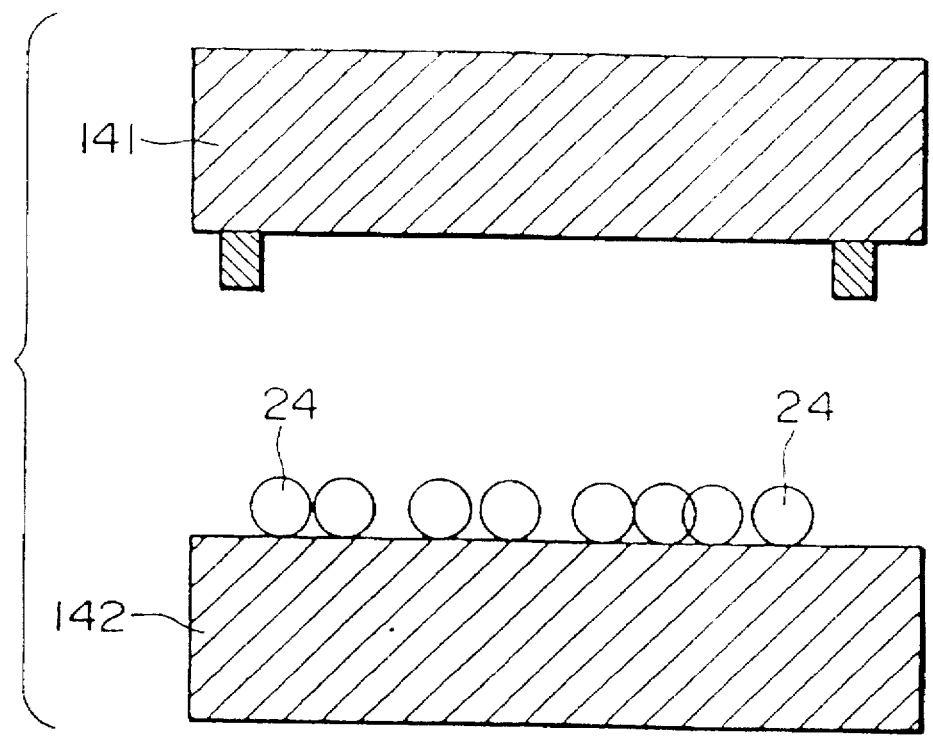
FIG. 15 is an exploded sectional side view for explaining a liquid crystal display.
Figure 16:
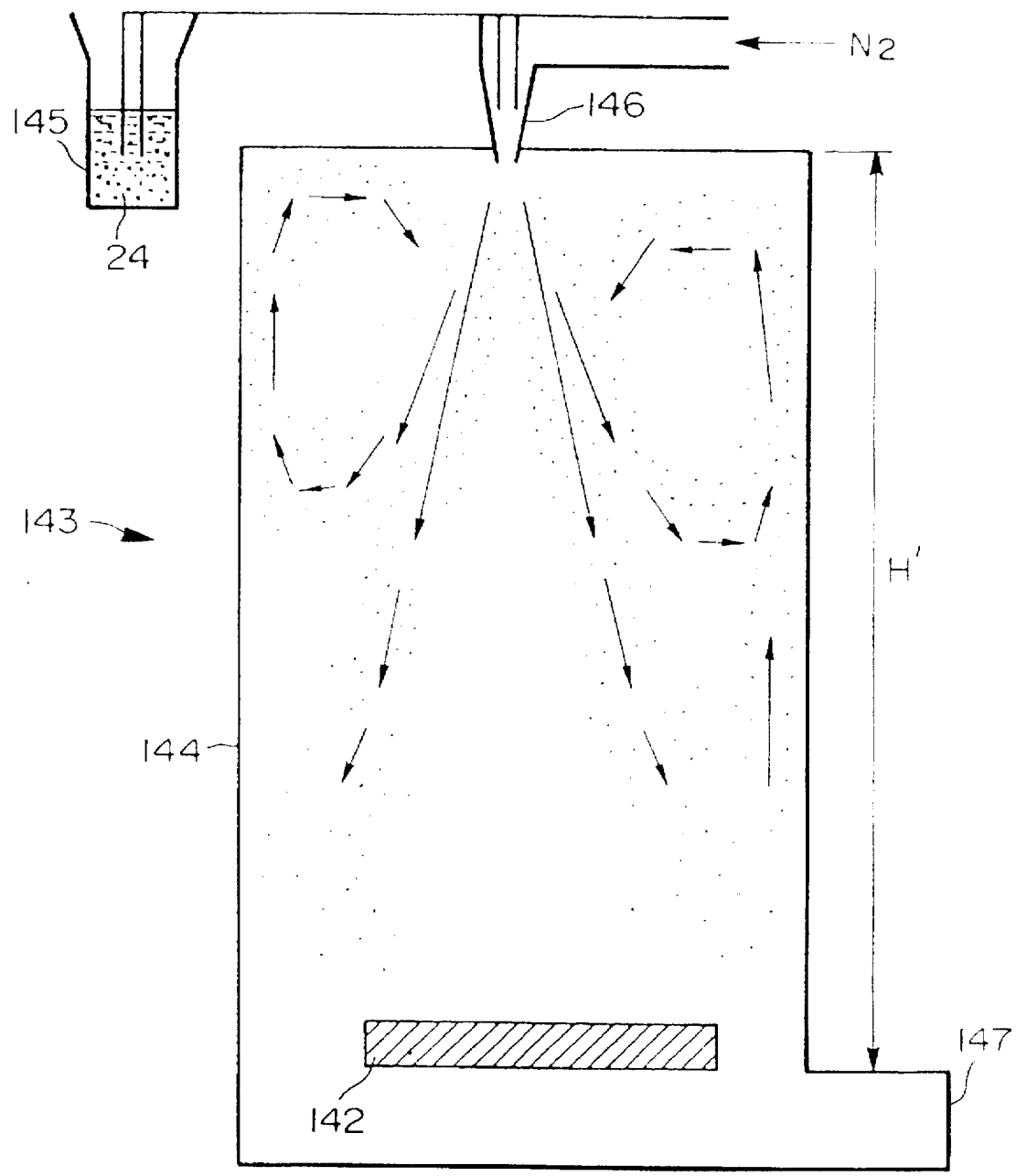
FIG. 16 is a side view showing a conventional fine particles dispersing apparatus.

FIG. 12 shows the state of dispersion obtained by using the conventional apparatus, while FIG. 13 shows the state of dispersion obtained by using the apparatus of the fourth embodiment.

From FIGS. 12 and 13 it is clearly seen that according to the conventional apparatus, many of the gap spacers agglomerate and are not dispersed uniformly, but that according to the apparatus of the fourth embodiment, the gap spacers are dispersed more uniformly without agglomeration.

As set forth hereinabove, the fine particles dispersing apparatus of the present invention is provided with a cylindrical body, a funnel nozzle provided at the bottom of the cylindrical body, and a valve means having a clearance forming member disposed so as to ensure a larger clearance than the fine particle diameter between it and the inner wall of the funnel nozzle, in which with oscillation of the funnel nozzle and/or the clearance forming member, the fine particles accommodated within the funnel nozzle pass through the above clearance and are discharged from the nose portion of the nozzle.

Since the fine particles present inside the funnel nozzle are discharged little by little from the nose portion of the nozzle, it is possible to spread agglomeration-free fine particles onto the surface of a substrate or the like in a good dispersed state.

It is not that the fine particles are kept dispersed in a solvent such as liquid flon or water. This is desirable from the environmental viewpoint. Besides, any equipment for solvent evaporation is not required, so it is possible to attain the reduction of size and cost.

According to the apparatus of the present invention, since the fine particles can be dispersed without relying on diffusion based on gravity-drop of the particles, it is possible to greatly shorten the distance between the nozzle and the substrate on which the particles are to be deposited.

Consequently, the fine particles deposition area can be diminished and it becomes possible to deposit fine particles on only a desired upper surface portion of the substrate. Moreover, a large proportion of the fine particles discharged from the nozzle can be deposited on the substrate and thus the efficiency of use of the fine particles is improved. Besides, the apparatus size can be reduced to a great extent. Further, the working time required for the dispersion and deposition of fine particles can be greatly shortened. Since it is not necessary to provide a step of exhausting and removing the residual fine particles at every replacement of the substrate, it is possible to attain further improvement in the efficiency of use of the fine particles and further shortening of the working time. Moreover, the mass-productivity is improved and a bad influence on the environment can be diminished.

Since the fine particles are discharged together with a high-speed air current through a very narrow clearance, the particles are dispersed and discharged in a more satisfactory state.

Further, since the fine particles are oscillated already when accommodated within the fine particles dispersing apparatus, their agglomeration during the accommodation is suppressed.

In the case where a change in internal pressure of the cylindrical body is utilized for oscillating the valve means, it is possible to effect the discharge and dispersion of fine particles easily and that highly efficiently.

Moreover, when the discharge of fine particles is to be stopped by the valve means, the fine particles which have just passed through the valve means and which are unnecessary can be brought back toward the cylindrical body and thus the discharge of excess fine particles can be diminished.

In this connection, if a pressure regulator means is used for inducing the pressure change, it becomes easier to control the pressure change, that is, the discharge of fine particles can be adjusted more accurately.

And if the pressure change is created by the supply of pulse air, it is possible to effect the discharge of fine particles in a more satisfactory manner.

Moreover, in the case where the fine particles are discharged while creating a pressure change in the interior of the cylindrical body, if the interior of the cylindrical body is partitioned into plural chambers through a diaphragm or diaphragms capable of pressure transfer in such a manner that at least a chamber to which the pressure regulator means is connected and a chamber which contains the fine particles are different from each other, then it is possible to prevent back flow of the fine particles toward the pressure regulator means.

Further, if the valve means is constituted by a spherical body, it is possible to attain a very simple construction, which greatly contributes to the reduction of cost of the apparatus.

Moreover, if the valve means is provided with an oscillating means, the amount of fine particles discharged can be kept highly accurate.

Likewise, such highly accurate discharge quantity of fine particles can be achieved also by providing an oscillating means on the funnel nozzle side.

In this connection, if a piezo-electric element with a high-frequency current applied thereto is used as the oscillating means, it is possible to adjust the amount of discharged fine particles in a satisfactory manner.

If a fine tube nozzle is provided at the nose portion the funnel nozzle, it become possible to discharge the fine particles at a higher speed and hence possible to improve the dispersed state of the particles. Particularly, this function can be enhanced by setting the length of the fine tube nozzle at 5 mm or more.

Further, if a monitor for measuring the amount of fine particles discharged is provided at the nose portion of the funnel nozzle, then by feedback of data obtained it is made possible to maintain the amount of discharged fine particles at an appropriate value.

The apparatus of the present invention is suitable particularly when the particle diameter is not larger than 10 µm, and in this case it is suitable to use a fine particles discharging nozzle having an inside diameter not larger than 500 µm.

It can be said that the apparatus of the present invention is suitable particularly when the fine particles are gap spacers interposed between the substrates of a liquid crystal display.

Further, if clearance-forming stepped portions are formed on the surface of the clearance forming member or of the funnel nozzle, it is possible to ensure a minimum width of the clearance for the passing of fine particles therethrough. Additionally, since the clearance forming member can be positioned centrally of the funnel nozzle, it is possible to maintain the amount of discharged fine particles appropriate and constant.

What is claimed is:

1. An apparatus for dispersing particles comprising:
   a body having an interior;
   a funnel nozzle having an inner surface communicating with the interior of the body, the inner surface tapering to a nose portion defining an opening;
   a spherical member movably disposed within the funnel nozzle adjacent the nose portion; and
   means for intermittently varying an internal pressure of said body such that the spherical member intermittently moves toward and away from the opening;
   wherein the intermittent movement of the spherical member causes an associated intermittent change in a clearance between the spherical member and the inner surface of the funnel nozzle, thereby causing particles within said funnel nozzle to intermittently pass through said clearance and to be discharged through the opening.

2. A particle dispersing apparatus according to claim 1, wherein the pressure varying means is a compressor which intermittently forces air into the body and discharges air from the body.

3. A particle dispersing apparatus according to claim 1, wherein a tube nozzle is connected to the nose portion of the funnel nozzle such that particles passing through the opening enter the tube nozzle, and wherein an inside diameter of the tube nozzle is less than 500 µm.

4. A particles dispersing apparatus according to claim 1, wherein a monitor for measuring an amount of particles discharged through the opening is provided at said nose portion of said funnel nozzle.

5. An apparatus for dispersing particles comprising:
   a body having an interior;
   a funnel nozzle having an inner surface communicating with the interior of the body, the inner surface tapering to a nose portion defining an opening;
   an oscillation element disposed within the interior of the body; and
   a clearance forming member mounted on the oscillating member and being located adjacent the nose portion; and
   wherein the oscillation element is alternately expandable and contractable, thereby intermittently varying a clearance between the clearance forming member and the inner surface of the funnel nozzle surrounding the opening such that particles within said funnel nozzle intermittently pass through the clearance and are discharged through the opening.

6. A particles dispersing apparatus according to claim 5, wherein the oscillation element is a piezoelectric element which intermittently expands and contracts in response to a high-frequency current applied thereto.

7. A particles dispersing apparatus according to claim 5, further comprising a second oscillation element mounted on an outer surface of the funnel nozzle.

8. A particles dispersing apparatus according to claim 5, wherein a tube nozzle is connected to the nose portion of the funnel nozzle such that particles passing through the opening enter the tube nozzle, and wherein an inside diameter of the tube nozzle is less than 500 µm.

9. A particles dispersing apparatus according to claim 5, wherein a monitor for measuring an amount of particles discharged through the opening is provided at said nose portion of said funnel nozzle.

10. A particles dispersing apparatus according to claim 5, further comprising a pressure regulator means for intermittently varying an internal pressure of said body.

11. A particles dispersing apparatus according to claim 10, wherein the interior of said body is partitioned into plurality of chambers such that a first chamber to which said pressure regulator means is connected and a second chamber in which the particles are accommodated are separated by at least one pressure-transferable diaphragm.

12. A particles dispersing apparatus including:

a body having an interior;

a funnel nozzle having an inner surface communicating with the interior of the body, the inner surface tapering to a nose portion defining an opening;

stepped portions formed on the inner surface of the funnel nozzle and extending radially from the opening;

a valve means having a clearance forming member located adjacent the opening;

a clearance control means for biasing said clearance forming member toward said stepped portions;

an oscillation means for intermittently changing a clearance between said valve means and said inner surface of the funnel nozzle from a minimum clearance when the clearance forming member abuts the stepped portions, and a maximum clearance when the clearance forming member is separated from the stepped portions;

wherein, when said clearance forming member is separated from the stepped portions, particles within said funnel nozzle pass through said clearance and are discharged through the opening.

13. A particles dispersing apparatus according to claim 12, further including a pressure regulator means for adjusting an internal pressure of said cylindrical body.

14. A particles dispersing apparatus according to claim 12, wherein said valve means comprises a spherical member.

15. A particles dispersing apparatus according to claim 12, wherein the oscillation means is a piezoelectric element which intermittently expands and contracts in response to a high-frequency current applied thereto.

16. A particles dispersing apparatus according to claim 12, wherein said oscillation means is mounted on an outer surface of the funnel nozzle.

* * * * *